US008554710B2

(12) United States Patent
Neely, III et al.

(10) Patent No.: US 8,554,710 B2
(45) Date of Patent: Oct. 8, 2013

(54) CONVERTING VIDEO METADATA TO PROPOSITIONAL GRAPHS FOR USE IN AN ANALOGICAL REASONING SYSTEM

(75) Inventors: Howard E. Neely, III, Santa Monica, CA (US); Robert S. Belvin, Potomac, MD (US); Michael J. Daily, Thousand Oaks, CA (US)

(73) Assignee: Raytheon Company, Waltham, MA (US)

( * ) Notice: Subject to any disclaimer, the term of this patent is extended or adjusted under 35 U.S.C. 154(b) by 310 days.

(21) Appl. No.: 13/025,736

(22) Filed: Feb. 11, 2011

(65) Prior Publication Data

US 2012/0259895 A1 Oct. 11, 2012

Related U.S. Application Data

(60) Provisional application No. 61/303,842, filed on Feb. 12, 2010.

(51) Int. Cl.
*G06F 17/18* (2006.01)
*G06N 5/00* (2006.01)

(52) U.S. Cl.
USPC .......... 706/45

(58) Field of Classification Search
USPC .......... 706/45
See application file for complete search history.

(56) References Cited

U.S. PATENT DOCUMENTS 4,777,585 A 10/1988 Kokawa et al.
4,899,290 A 2/1990 Hartzband
4,905,162 A 2/1990 Hartzband et al.
5,276,774 A 1/1994 Orihara et al.
5,473,732 A 12/1995 Chang
5,696,693 A 12/1997 Aubel et al.
5,852,814 A 12/1998 Allen
7,599,902 B2 * 10/2009 Fox et al. .......... 706/54
2004/0133526 A1 7/2004 Shmueli et al.

OTHER PUBLICATIONS

VERL: An Ontology Framework for Representing and Annotating Video Events Alexandre R.J. François and Ram Nevatia University of Southern California Jerry Hobbs Information Sciences Institute, USC Robert C. Bolles SRI International.*

When Subjects Behave Like Objects: An Analysis of the Merging of S and O in Sentencefocus Constructions Across Languages Knud Lambrecht University of Texas at Austin.*

"Proposer Information Pamphlet (PIP) for the Video Analysis and Content Extraction (VACE) Program—Phase III," BAA 06-01-MT Disruptive Technology Office, Fort George G. Meade, MD, Feb. 2, 2006, pp. 1-61.

(Continued)

*Primary Examiner* — Kakali Chaki
*Assistant Examiner* — Ababacar Seck
(74) *Attorney, Agent, or Firm* — Daly, Crowley, Mofford & Durkee, LLP

(57) ABSTRACT

An automatic approach is described for the semantic analysis and conversion of video annotation metadata (e.g., Video Event Markup Language or "VEML" metadata) to propositional graphs suitable for analysis by an analogical reasoning system (ARS). Also as described herein, a system architecture implements this conversion while maintaining semantic consistency from annotation through results reporting. Further, the techniques herein leverage the same ontology to populate options for an annotation tool, provide the rules for the metadata-to-propositional graph mapping, and provide the basis for comparison in an analogical reasoning algorithm.

23 Claims, 39 Drawing Sheets

(56) References Cited

OTHER PUBLICATIONS

Berners-Lee, T. "Uniform Resource Identifier (URI): Generic Syntax," RFC3986, Network Working Group, The Internet Society, Jan. 2005, pp. 1-61.
Bogdanowicz, J. et al. "COGnitive ENGine Technologies (COGENT)—An Innovative Architecture for Cognitive Processing," 10th Annual Workshop on High Performance Embedded Computing (HPEC 2006), Sep. 20, 2006, Lexington, MA, pp. 1-24 (http://www.ll.mit.edu/HPEC/agendas/proc06/Day2/22_Bogdanowicz_Pres.pdf).
Bolles, B. et al., "A Hierarchical Video Event Ontology in OWL, 2004 ARDA Challenge Project, Final Report," PNNL-14981, Oct. 8, 2004, pp. 1-143.
Class Calendar, Java™ 2 Platform Std. Ed. V1.4.2, 2003, 2010, pp. 1-33. (http://java.sun.com/j2se/1.4.2/docs/api/java/util/Calendar.html).
"DARPA-BAA-09-40, Deep Learning (DL) Broad Agency Announcement (BAA) for Information Processing Techniques Office (IPTO)", Defense Advanced Research Projects Agency (DARPA), pp. 1-49.
Eilenberger, D. "GEOINT Serves NATO," Pathfinder, The National Geospatial-Intelligence Agency; vol. 7, No. 2, Mar./Apr. 2009; 3 Pages (https://www1.nga.mil/Newsroom/Pathfinder/0702/Pages/default.aspx).
Francois, A.R.J. et al. (2005) "VERL: An Ontology Framework for Representing and Annotating Video Events," IEEE Multimedia, Oct.-Dec. 2005, pp. 76-86.
Gansner, E. et al. "Drawing Graphs with *dot," dot* User's Manual, Jan. 26, 2006, pp. 1-40 (http://www.praphviz.org/pdf/dotguide.pdf).
"Unmanned Aircraft Systems: Federal Actions Needed to Ensure Safety and Expand Their Potential Uses within the National Airspace System," GAO-08-511, U.S. Government Accountability Office, May 2008, pp. 1-68 (http://www.gao.gov/new.items/d08511.pdf).
Holyoak, Keith J. et al, "Introduction: The Place of Analogy in Cognition," The Analogical Mind: Perspectives from Cognitive Science, MIT Press. Cambridge, MA, pp. 1-19.
Herman, I. (2007) "W3C Semantic Web: Web Ontology Language (OWL)," OWL Working Group, Sep. 6, 2007, (http://www.w3.org/2004/OWL/), 3 pages.
"HRL Laboratories: Thinking Outside the Box," IEEE Intelligent Informatics Bulleting; Dec. 2006, vol. 7, No. 1, pp. 1-3.
Kilgariff, E. et al. (2005) "The GeForce 6 Series GPU Architecture, in GPU Gems 2: Programming Techniques for High-Performance Graphics," M. Pharr. ed., NVIDIA Corporation, (http://download.nvidia.com/developer/GPU_Gems_2/GPU_Gems2_ch30.pdf), 22 pages.
Fielding, R. et al. "HTTP—Hypertext Transfer Protocol—HTTP/1.1", Jun. 1999 pp. 1-114 (http://www.w3.org/Protocols/).
Leach, P. "A Universally Unique Identifier (UUID) URN Namespace," Network Working Group, The Internet Society, Jul. 2005, pp. 1-30 (http://www.ietf.org/rfc/rfc4122.txt).
Markman, A.B. et al., "Analogical Reasoning Techniques in Intelligent Counterterrorism Systems," International Journal "Information Theories & Applications" vol. 10, pp. 139-146.
Martinez, J.M. et al "MPEG-7: The Generic Multimedia Content Description Standard, Part 1," IEEE Multimedia, IEEE Computer Society Apr.-Jun. 2002, pp. 78-87.
Moellman, D., "Bidder Brief: VACE Phase III BAA Discussion," Disruptive Technology Office, Jan. 20, 2006, (http://www.aqd.nbc.gov/solic/uploads/BAA-08-VACE_FinalBidders.ppt), 38 pages.
National Research Council of the National Academies (2008) "Protecting Individual Privacy in the Struggle Against Terrorists: A Framework for Program Assessment," The National Academies Press, Washington, D.C p. 130.
Francois, A. et al., "An Ontology for Video Event Presentation," Proceedings of the 2004 IEEE Computer Society Conference on Computer Vision and Pattern Recognition Workshops (CVPRW'04), pp. 1-10.
Nevatia, R.. et al., "A Hierarchical Language-Based Representation of Events in Video Streams, Conference on Computer Vision and Pattern Recognition Workshop (CVPRW '03)," Jun. 16-22, 2003, pp. 1-8.
Segal, M. et al. "The OpenGL® Graphics System: A Specification (Version 1.1)," Silicon Graphics, Inc., Mar. 4, 1977, pp. 1-194 (http://www.opengl.org/documentation/specs/version1.1/GLspec1.1.ps).
Stalzer, T. (2008) "Persistent Surveillance Systems: Real-Time Multi-Sensor Tactical Intelligence to Counter Asymmetric Threats," Raytheon Company, 2 pgs. (http://www.raytheon.com/capabilities/rtnwcm/groups/ncs/documents/content/rtn_ncs_products_psds_pdf.pdf).
Sterling, T.L. et al. "Gilgamesh: A Multithreaded Processor-In-Memory Architecture for Petaflops Computing," Proceedings of the IEEE/ACM Supercomputing 2002 Conference 2002, pp. 1-22., (http://ieeexplore.ieee.org/iel5/10618/33527/01592884.pdf).
W3C Recommendation, "OWL Web Ontology Language Guide, World Wide Web Consortium," Feb. 10, 2004 (http://www.w3.org/TR/owl-guide/), 35 pages.
W3C Recommendation, "OWL Web Ontology Language Overview, World Wide Web Consortium," Feb. 10, 2004, (http://www.w3.org/TR/owl-features/), 14 pages.
W3C Recommendation, "OWL Web Ontology Language Reference, World Wide Web Consortium," Feb. 10, 2004 (http://www.w3.org/TR/owl-ref/), 55 pages.
Comrie, "Language Universals and Linguistic Typology, Syntax and Morphology", University Press, Chicago, 1981, 7 pages.
Marantz, "On the Nature of Grammatical relations", by the Massachusetts Institute of Technology, 1984, 6 pages.
Allen, J.F. et al. (1994). "Actions and Events in Interval Temporal Logic," Technical Report 521, Computer Science Department, University of Rochester (http://dspace.lib.rochester.edu/retrieve/1531/94.tr521.Actions_and_events_in_interval_temporal_logic.ps).
Bolles, B. et al., "2003 ARDA Event Taxonomy Challenge Project, Final Report," Feb. 9, 2004 (http://rrc.mitre.org/nwrrc/event-taxonomy-final-report.pdf).
"Data Distribution Service for Real-time Systems, v1.2," Object Management Group, Inc., (http://www.omg.org/technology/documents/formal/data_distribution.htm).
Gregorio, J. ed. (2007) "The Atom Publishing Protocol, RFC 5023, Network Working Group, The Internet Society," (http://tools.ietf.org/html/rfc5023).
Hummel, J.E. et al. (2003) "A Symbolic-Connectionist Theory of Relational Inference and Generalization," Psychological Review, vol. 110, No. 2, pp. 220-264.
Kipp, M. "Anvil 4.0 Annotation of Video and Spoken Language, User Manual," Graduate College for Cognitive Science, University of Sarrland and German Research Center for Artificial Intelligence (http://www.dfki.de/-kipp/anvil) (2003) pp. 1-52.
Nottingham, M. ed. (2005) "The Atom Syndication Format, RFC 4287, Network Working Group, The Internet Society," (http://tools.ietf.org/html/rfc4287.
VIPER: "The Video Performance Evaulation Resource," (http://viper-toolkit.sourceforge.net).

* cited by examiner

THREAT BEHAVIOR CASES

505

| SCENARIO | DESCRIPTION |
|---|---|
| Case Facility Perimeter 1 (CFP1) | Pedestrian enters the FOV, removes binoculars from a bag, cases the facility, stows binoculars back into the bag, then walks out of the FOV. |
| Case Facility Perimeter 2 (CFP2) | Person drives up in a vehicle, stops the vehicle, produces binoculars, cases the facility from the vehicle, stows the binoculars, then drives away. |
| Emplace Object Form Vehicle (EFV) | Person drives up in a vehicle, stops the vehicle, exits the vehicle carrying an object, walks toward a sensitive facility object (such as a fuel tank), returns to the vehicle without the object, then drives away. |
| Emplace Object Under Vehicle (EUV) | Pedestrian approaches a parked vehicle carrying an object, crouches down, leaves the vicinity of the vehicle without the object. |
| Abandon Vehicle (AV) | Person drives a vehicle into the FOV, parks the vehicle by a sensitive object, exits the vehicle, then walks away. |
| Intrude Over Fence (IOF) | Pedestrian enters the FOV, and after furtive looking around, hops over the fence, then walks out of the FOV. |

FIG. 5A

NON-THREAT BEHAVIOR CASES

510

| SCENARIO | DESCRIPTION |
|---|---|
| Non-Threat Event 1 (NTE1) | Small herd of deer walk past vehicles parked in parking lot. |
| Non-Threat Event 2 (NTE2) | Person drives into parking lot in a vehicle, parks the vehicle, exits the vehicle, then walks towards the facility. |
| Non-Threat Event 3 (NTE3) | Person walks up to vehicle carrying a bag, opens vehicle normally (i.e., does not break in), stows bag inside of vehicle, then walks back in the same direction from whence he came. |

FIG. 5B

TABLE 1 - Meaning of the six event arguments:

| PREDICATE TYPE | ARG 1 | ARG 2 | ARG 3 | ARG 4 | ARG 5 | ARG 6 |
|---|---|---|---|---|---|---|
| Intransitive | Intransitive Subject | | | | Locative Relation | Locative Object |
| Transitive | Logical Subject | Logical Subject | | | Locative Relation | Locative Object |
| Intransitive w/ Oblique Args | Intransitive Subject | | Preposition | Prepositional Object | Locative Relation | Locative Object |
| Transitive w/ Oblique Args | Logical Subject | Logical Subject | Preposition | Prepositional Object | Locative Relation | Locative Object |

FIG. 6A

TABLE 2 - Examples of annotation parsed into a predicate and arguments

| PREDICATION | PREDICATE | ARG 1 | ARG 2 | ARG 3 | ARG 4 | ARG 5 | ARG 6 |
|---|---|---|---|---|---|---|---|
| P1 Loiters (Intransitive) | Loiter | P1 | | | | | |
| P1 Loiters Behind the Guardhouse (Intransitive w/ Oblique Args) | Loiter | P1 | | | | Behind | Guard-house |
| P1 Gives a Package to P2 (Transitive) | Give | P1 | Package | to | P2 | | |
| P1 Attacks P2 by the Wall (Transitive w/ Oblique Args) | Attack | P1 | P2 | | | by | Wall |
| P1 Gives a Gun to P2 Behind the Guardhouse (Transitive w/ Oblique Args) | Give | P1 | Gun | to | P2 | Behind | Guard-house |

FIG. 6B

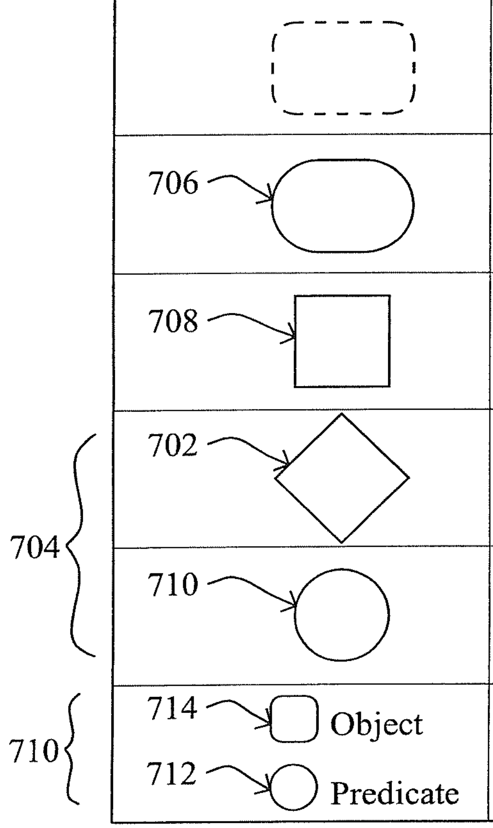

| SYMBOL | ENTITY | PURPOSE | EXAMPLES |
|---|---|---|---|
| | Analog | A Collection of Propositions | ·Individual Makes Bomb<br>·Bomb Destroys Target |
| 706 | Proposition | A Relational Struction, Including a Predicate and Potentially Many Roles and Role Filters | ·Individual Makes Bomb |
| 708 | Sub Proposition | Binds Predicates (roles) to Arguments (role filters) | ·Individual as Maker<br>·Bomb as Made |
| 702 | Predicate | The Role of a Relation | ·Maker<br>·Made |
| 710 | Object | A Role Filter | ·Individual<br>·Bomb |
| 714 Object<br>712 Predicate | Simple Semantics | A Token Based Semantic Unit | ·Explosive |

FIG. 7

```
<owl:Class rdf:ID="TransitiveEvent">
 <rdfs:subClassOf rdf:resource="#PrimitiveEvent"/>
 <rdfs:subClassOf>
   <owl:Restriction owl:cardinality="1">
     <owl:onProperty
rdf:resource="hasLogicalSubject"/>
   </owl:Restriction>
 </rdfs:subClassOf>
 <rdfs:subClassOf>
   <owl:Restriction owl:cardinality="1">
     <owl:onProperty
rdf:resource="hasLogicalObject"/>
   </owl:Restriction>
 </rdfs:subClassOf>
</owl:Class>
<owl:ObjectProperty rdf:ID="hasLogicalSubject">
 <rdfs:subPropertyOf
rdf:resource="hasRoleSemantics"/>
 <rdfs:domain rdf:resource="#TransitiveEvent"/>
 <rdfs:range  rdf:resource="#LogicalSubject"/>
</owl:ObjectProperty>
<owl:Class rdf:ID="LogicalSubject">
 <rdfs:subClassOf rdf:resource="#RoleEntity"/>
</owl:Class>
<owl:ObjectProperty rdf:ID="hasLogicalObject">
 <rdfs:subPropertyOf
rdf:resource="#hasRoleSemantics"/>
 <rdfs:domain rdf:resource="#TransitiveEvent"/>
 <rdfs:range  rdf:resource="#LogicalObject"/>
 </owl:ObjectProperty>
<owl:Class rdf:ID="LogicalObject">
 <rdfs:subClassOf rdf:resource="#RoleEntity"/>
 </owl:Class>
```

ObjectProperty hasLogicalObject and hasLogicalSubject are used to Bind Classes TransitiveSubject and TransitiveObject to Class TransitiveEvent

FIG. 8

```
<TransitiveEvent rdf:ID="Extract">
 <hasLogicalSubject rdf:resource="#Extract_LS"/>
 <hasLogicalObject  rdf:resource="#Extract_LO"/>
</TransitiveEvent>
<LogicalSubject rdf:ID="Extract_LS"/>
<LogicalObject  rdf:ID="Extract_LO"/>
```

Declaration of Individual "Extract" in the Video Event Ontology File

FIG. 9

```
<owl:Class rdf:ID="IntransitiveEvent">
 <rdfs:subClassOf rdf:resource="PrimitiveEvent"/>
 <rdfs:subClassOf>
   <owl:Restriction owl:cardinality="1">
     <owl:onProperty
rdf:resource="#hasIntransitiveSubject"/>
   </owl:Restriction>
 </rdfs:subClassof>
</owl:Class>
<owl:ObjectProperty
rdf:ID="hasIntransitiveSubject">
 <rdfs:subPropertyOf
rdf:resource="#hasRoleSemantics"/>
 <rdfs:domain rdf:resource="IntransitiveEvent"/>
 <rdfs:range  rdf:resource="#IntransitiveSubject"/>
</owl:ObjectProperty>
<owl:Class rdf:ID="IntransitiveSubject">
 <rdfs:subjectClassOf rdf:resource="#RoleEntity"/>
</owl:Class>
```

OWL Object Property Used to Define InstransitiveSubject for Class IntrasitiveEvent

FIG. 10

```
<owl:Class rdf:ID="LocativeRelation">
  <rdfs:subClassOf rdf:resource="RoleEntity"/>
  <rdfs:subClassOf>
    <owl:Restriction owl:minCardinality="0">
      <owl:opnProperty
rdf:resource="#hasAdverbialSubject"/>
    <owl:Restriction>
  </rdfs:subClassOf>
  <rdfs:subClassOf>
    <owl:Restriction owl:minCardinality="0">
      <owl:onProperty rdf:resource="#hasAdverbialObject"/>
    </owl:Restriction>
  <rdfs:subClassOf>
</owl:Class>

<owl:ObjectProperty rdf:ID="hasAdverbialSubject">
  <rdfs:subPropertyOf rdf:resource="#hasRoleSemantics"/>
  <rdfs:domain rdf:resource="#LocativeRelation"/>
  <rdfs:range  rdf:resource="#AdverbialSubject"/>
</owl:ObjectProperty>

<owl:Class rdf:ID="AdverbialSubject">
  <rdfs:subClassOf rdf:resource="#RoleEntity"/>
</owl:Class>

<owl:ObjectProperty rdf:ID="hasAdverbialObject">
  <rdfs:subPropertyOf rdf:resource="#hasRoleSemantics:/>
  <rdfs:domain rdf:resource="#LocativeRelation"/>
  <rdfs:range  rdf:resource="#AdverbialSubject"/>
</owl:ObjectProperty>

<owl:Class rdf:ID="AdverbialObject">
  <rdfs:subClassOf rdf:resource="#RoleEntity"/>
</owl:Class>

<LocativeRelation rdf:ID="TO_LEFT_OF">
  <hasAdverbialSubject rdf:resource="#TO_LEFT_OF_AS"/>
  <hasAdverbialObject  rdf:resource="#TO_LEFT_OF_AO"/>
</LocativeRelation>
<AdverbialSubject rdf:ID="TO_LEFT_OF_AS"/>
<AdverbialObject  rdf:ID="TO_LEFT_OF_AO"/>
```

OWL object properties used to define adverbial subject and object for class LocativeRelation and individual for locative relation "TO_LEFT_OF"

FIG. 12

```
<owl:Class rdf:ID="TransitiveState">
  <rdfs:subClassOf rdf:resource="#State"/>
  <rdfs:subClassOf>
    <owl:Restriction owl:cardinality="1">
      <owl:onProperty rdf:resource="#hasStativeSubject"/>
    <owl:Restriction>
  </rdfs:subClassOf>
  <rdfs:subClassOf>
    <owl:Restriction owl:cardinality="1">
      <owl:onProperty rdf:resource="#hasStativeObject"/>
    </owl:Restriction>
  <rdfs:subClassOf>
</owl:Class>

<owl:Class rdf:ID="TemporalRelation">
  <rdfs:subClassOf rdf:resource="#TransitiveState"/>
</owl:Class>

<owl:ObjectProperty rdf:ID="hasStativeSubject">
  <rdfs:subPropertyOf rdf:resource="#hasRoleSemantics"/>
  <rdfs:domain rdf:resource="#TransitiveState"/>
  <rdfs:range  rdf:resource="#StativeSubject"/>
</owl:ObjectProperty>

<owl:ObjectProperty rdf:ID="hasStativeObject">
  <rdfs:subPropertyOf rdf:resource="#hasRoleSemantics:/>
  <rdfs:domain rdf:resource="#TransitiveState"/>
  <rdfs:range  rdf:resource="#Stativeobject"/>
</owl:ObjectProperty>

<owl:Class rdf:ID="StativeSubject">
  <rdfs:subClassOf rdf:resource="#RoleEntity"/>
</owl:Class>

<owl:Class rdf:ID="StativeObject">
  <rdfs:subClassOf rdf:resource="#RoleEntity"/>
</owl:Class>

<TemporalRelation rdf:ID="Before">
  <hasAdverbialSubject rdf:resource="#Before_TS"/>
  <hasAdverbialObject  rdf:resource="#Before_TO"/>
</TemporalRelation>
<StativeSubject rdf:ID="#Before_TS"/>
<StativeObject rdf:ID="#Before_TO"/>
```

OWL object properties used to define stative subject and object for TemporalRelation and the individual for temporal relation "BEFORE"

FIG. 13

CONVERTING VIDEO METADATA TO PROPOSITIONAL GRAPHS FOR USE IN AN ANALOGICAL REASONING SYSTEM

CROSS REFERENCE TO RELATED APPLICATION

The present application claims the benefit of U.S. Provisional Patent Application Ser. No. 61/303,842, entitled SYSTEM AND METHOD FOR DETECTING BEHAVIOR IN VIDEO METADATA USING AN ANALOGICAL REASONING SYSTEM filed on Feb. 12, 2010 by Neely et al., the contents of which are hereby incorporated by reference in their entirety.

STATEMENT REGARDING FEDERALLY SPONSORED RESEARCH

Not Applicable.

FIELD OF THE INVENTION

The concepts described herein relate to systems and techniques for automatically detecting certain behaviors, and more particularly to systems and techniques which convert video annotation metadata for use with automatically detecting certain behaviors.

BACKGROUND OF THE INVENTION

Surveillance video is becoming increasingly important, such as for military operations, homeland defense, and law enforcement. For example, the amount of video data produced annually by military unmanned aerial vehicles alone is in the petabyte range, and is growing rapidly. Also, many municipalities and companies use closed-circuit television cameras to monitor activity. For instance, Great Britain alone uses approximately 4.2 million closed circuit cameras throughout its cities (e.g., London). Clearly, efficient analysis of this huge volume of surveillance video requires automatic or interactive techniques.

SUMMARY OF THE INVENTION

Video surveillance systems are generating much more imagery than can be cost-effectively analyzed by human analysts. One approach to the automated analysis of this imagery is to split the problem into video-to-metadata and metadata-to-interpretation tasks. The techniques herein are directed primarily to a system for the metadata-to-interpretation task that automatically extracts propositional graphs from the video metadata and generates graphs for use in an analogical reasoning system, e.g., to detect threat behaviors that occurred in the original video scene.

Described herein is an automatic approach for the semantic analysis and conversion of video annotation metadata (e.g., Video Event Markup Language or "VEML" metadata) to propositional graphs suitable for analysis by an analogical reasoning system (ARS). Also as described herein, a system architecture implements this conversion while maintaining semantic consistency from annotation through results reporting. Further, the techniques herein leverage the same ontology to populate options for an annotation tool, provide the rules for the metadata-to-propositional graph mapping, and provide the basis for comparison in an analogical reasoning algorithm.

In particular, in accordance with one or more embodiments herein, a system and method for detecting the presence of specific kinds of behavior expressed in semantic metadata by analogy with similar behaviors is described. The analogy is determined computationally using an Analogical Reasoning System (ARS). Generation of semantic metadata (by human or machine annotators), conversion of the metadata to a form suitable for analogical reasoning, and the actual analogical reasoning processing are all based on a common ontological model of behaviors. Conversion of the metadata to a form suitable for analogical reasoning is automatic.

With this particular arrangement, a system for automatically detecting certain behaviors, e.g., threat behaviors, in surveillance video is provided. Such detection is accomplished by pairing the system with an external system that can input surveillance video and output metadata that describes the objects and events in the video.

The system and techniques described herein use an ARS to match cases of behavior extracted from video metadata to analogous cases in previously seen and classified metadata. These cases are represented in the ARS as propositional graphs that interconnect through a semantic layer.

One advantage of the system and techniques described herein over prior art systems is the use of an Ontological Semantic Layer (OSL). Whereas the ARS in some prior art systems use a single, flat semantic layer, the system and techniques described herein use a hierarchical structure of concepts, derived directly from a domain-specific ontology, for the semantic layer. In a distributed implementation, the OSL can be replicated on each processor node, forming a Distributed OSL (DOSL). The DOSL also provides an advantage over semantic layers used in other prior art systems in that each node has a complete semantic layer instead of distributing the layer over all processor nodes of the system. The result is that much less communication traffic is needed for the phases of the analogical reasoning algorithm. The downside is that each processor node must allow memory space for the data structures of the DOSL. However, memory is inexpensive while bandwidth is expensive, so this space/time tradeoff is advantageous.

Another advantage of the system and techniques described herein over prior art systems is the capability to read and write propositional graphs from and to a database. This provides both persistent storage for the graphs and a convenient way to distribute the graphs to the nodes of the ARS.

Construction of the propositional graphs used in an ARS is extremely labor-intensive. One advantage of the system and techniques described herein over prior art systems and techniques is the automatic extraction of propositional graphs from video metadata structured by the method described by this invention.

Finally, the system and techniques described herein have the advantage that it can receive the metadata from which propositional graphs are extracted as an Atom feed according to the Atom Syndication Format, and can post results back in accordance with the Atom Publishing Protocol. One of ordinary skill in the art will see that any other syndication method, such as Really Simple Syndication (RSS), could also be used.

In one embodiment, a computer-implemented method, comprises: obtaining video annotation metadata; identifying one or more events and one or more objects within the video annotation metadata; associating one or more of the identified objects with each identified event as a corresponding predication; and storing a propositional graph in a database for each predication by: i) determining whether a particular event of the predication is a transitive predicate or an intransitive predicate; ii-a) in response to the event being a transitive predicate, creating a logical subject role and logical object role; ii-b) in response to the event being an intransitive predicate, creating an intransitive subject role; and iii) binding one or more corresponding associated objects to corresponding created roles for the particular event in the propositional graph.

In one embodiment, the method's storing further comprises: determining whether a particular object is associated with a quantity attribute; and if so, binding the quantity attribute to the particular object in the propositional graph.

In one embodiment, the method's storing further comprises: determining whether a particular object is associated with a color attribute; and if so, binding the color attribute to the particular object in the propositional graph.

In one embodiment, one or more of the identified objects are associated with object maps containing a plurality of attributes of a particular corresponding object.

In one embodiment, the method's storing further comprises: determining whether a preposition is defined in the predication; and if so, a) creating a prepositional object role, and b) binding a corresponding object of the preposition to the prepositional object role for the preposition in the propositional graph.

In one embodiment, the method's storing further comprises: determining whether a locative relation is defined in the predication; and if so, a) creating an adverbial subject role and an adverbial object role, and b) binding a corresponding event of the locative relation to the adverbial subject role and a corresponding object of the locative relation to the adverbial object role in the propositional graph (e.g., in a separate, related locative propositional graph).

In one embodiment, the method's storing further comprises: determining a temporal relation between a pair of event predications; creating a temporal object role and a temporal subject role in a temporal propositional graph; and binding a first event predication of the pair to the temporal object role and a corresponding second event predication of the pair to the temporal subject role in the temporal propositional graph.

In one embodiment, the method's storing further comprises: storing the propositional graph as a source case.

In one embodiment, the method's storing further comprises: storing the propositional graph as a target case; comparing the target case to a plurality of source case propositional graphs; and matching the target case to a most similar source case of the plurality of source case propositional graphs. In one embodiment, this further comprises: obtaining the plurality of source case propositional graphs from a cloud server.

In one embodiment, the method further comprises: storing an ontological semantic layer of roles, role semantic elements and object semantic elements. In one embodiment, this further comprises: utilizing the ontological semantic layer both for annotating corresponding video and for identifying events and objects within the video annotation metadata. In another embodiment, it further comprises: organizing the ontological semantic layer as a hierarchical ontological semantic layer such that elements not within the hierarchical ontological semantic layer have the ability to be represented by a corresponding superclass within the hierarchical ontological semantic layer. In another embodiment, it further comprises: obtaining the ontological semantic layer from a cloud server. In another embodiment, it further comprises: storing the ontological semantic layer on each of a plurality of analogical reasoner nodes configured to store the propositional graph.

In one embodiment, a tangible, non-transitory, computer-readable medium has program instructions thereon, the program instructions when executed by a processor operable to: obtain video annotation metadata; identify one or more events and one or more objects within the video annotation metadata; associate one or more of the identified objects with each identified event as a corresponding predication; and store a propositional graph in a database for each predication by being operable to: i) determine whether a particular event of the predication is a transitive predicate or an intransitive predicate; ii-a) in response to the event being a transitive predicate, create a logical subject role and logical object role; ii-b) in response to the event being an intransitive predicate, create an intransitive subject role; and iii) bind one or more corresponding associated objects to corresponding created roles for the particular event in the propositional graph.

In one embodiment, the computer-readable medium has program instructions that when executed by the processor to store are further operable to: determine whether a preposition is defined in the predication; and if so, a) create a prepositional object role, and b) bind a corresponding object of the preposition to the prepositional object role for the preposition in the propositional graph.

In one embodiment, the computer-readable medium has program instructions that when executed by the processor to store are further operable to: determine whether a locative relation is defined in the predication; and if so, a) create an adverbial subject role and an adverbial object role, and b) bind a corresponding event of the locative relation to the adverbial subject role and a corresponding object of the locative relation to the adverbial object role in the propositional graph (e.g., in a separate, related locative propositional graph).

In one embodiment, the computer-readable medium has program instructions that when executed by the processor to store are further operable to: determine a temporal relation between a pair of event predications; create a temporal object role and a temporal subject role in a temporal propositional graph; and bind a first event predication of the pair to the temporal object role and a corresponding second event predication of the pair to the temporal subject role in the temporal propositional graph.

In one embodiment, the computer-readable medium has program instructions that when executed by the processor are further operable to: store the propositional graph as a target case; compare the target case to a plurality of source case propositional graphs; and match the target case to a most similar source case of the plurality of source case propositional graphs.

In one embodiment, the computer-readable medium has program instructions that when executed by the processor are further operable to: store an ontological semantic layer of roles, role semantic elements, and object semantic elements, the ontological semantic layer organized as a hierarchical ontological semantic layer such that objects and events not within the hierarchical ontological semantic layer have the ability to be represented by a corresponding superclass within the hierarchical ontological semantic layer.

In one embodiment, a system comprises: an input configured to obtain video annotation metadata; a proposition extractor configured to identify one or more events and one or more objects within the video annotation metadata and to associate one or more of the identified objects with each identified event as a corresponding predication; a database; and one or more analogical reasoner nodes configured to store a propositional graph in the database for each predication by being configured to: i) determine whether a particular event of the predication is a transitive predicate or an intransitive predicate; ii-a) in response to the event being a transitive predicate, create a logical subject role and logical object role;

ii-b) in response to the event being an intransitive predicate, create an intransitive subject role; and iii) bind one or more corresponding associated objects to corresponding created roles for the particular event in the propositional graph.

BRIEF DESCRIPTION OF THE DRAWINGS

The foregoing features of this invention, as well as the invention itself, may be more fully understood from the following description of the drawings in which:

FIGS. 5A-B are tables of example behavior cases that may be detected by a data processing system;

FIGS. 6A-B are tables of example arguments based on predicate types and example predications, respectively;

FIG. 7 is an example legend for use with propositional graphs as used herein;

FIG. 8 is example Web Ontology Language (OWL) code showing creation of properties for transitive event predicates and in particular shows that ObjectProperty hasLogicalObject and hasLogicalSubect are used to bind classes TransitiveSubject and TransitiveObject to class TransitiveEvent;

FIG. 9 is an example Declaration of Individual "Extract" in the Video Event Ontology File and in particular is an example of the declaration of the "Extract" event instance (called an "individual" in OWL terminology) with its logical subject and logical object as OWL object properties;

FIG. 10 is an example OWL object property used to define IntransitiveSubject for class IntransitiveEvent;

FIG. 12 illustrates example OWL object properties used to define adverbial subject and object for class LocativeRelation and individual for locative relation "TO_LEFT_OF";

FIG. 13 illustrates example OWL object properties used to define stative subject and object for TemporalRelation, and the individual for temporal relation "BEFORE";

DETAILED DESCRIPTION OF AN ILLUSTRATIVE EMBODIMENT

Figure 1:
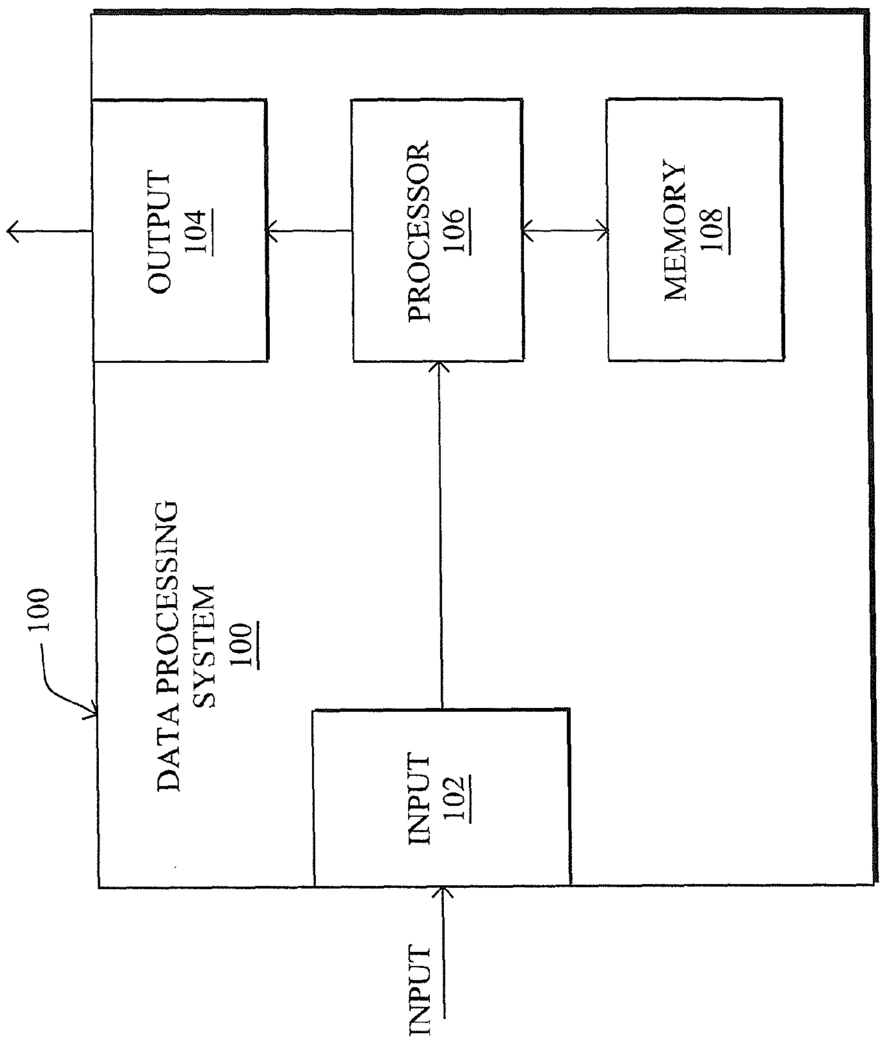
FIG. 1 is an example block diagram of a data processing system.

As noted above, surveillance video is becoming increasingly important, and efficient analysis of the huge volume of surveillance video requires automatic or interactive techniques. There are several research efforts dedicated to developing the techniques for detecting events and behaviors in surveillance video needed to provide semantic annotations that are useful to and understandable by the human analyst. One technical approach, promoted by the ARDA/DTO/IARPA Video Analysis Content Extraction (VACE) program, is to begin implementation of a solution to the problem with a content extraction phase in which metadata is extracted from the video signal to form a "richly annotated temporal log" that contains symbolic representations of the activities, events, relationships, and other important content in the video. The Video Event Representation Language (VERL) and Video Event Markup Language (VEML) are two metadata representation proposals that have emerged from the VACE program.

Although not part of the VACE program, the techniques described herein utilize video annotation metadata, such as VERL, VEML, and others (e.g., MPEG-7, as will be understood by those skilled in the art), and consider the problem of using analogical reasoning to match behaviors described in the metadata to previously seen and analyzed behavioral cases, and reason about missing components in the newly analyzed video scenes.

The techniques herein describe an automatic approach for the semantic analysis and conversion of video annotation metadata (e.g., VEML metadata) to propositional graphs suitable for analysis by an analogical reasoning system (ARS). In one embodiment, this conversion is implemented while maintaining semantic consistency from annotation through results reporting. Further, the techniques herein leverage the same ontology to populate options for an annotation tool, provide the rules for the metadata-to-propositional graph mapping, and provide the basis for comparison in an analogical reasoning algorithm.

Notably, many other research efforts have focused on the automatic extraction, exploration, and understanding of video scenes. The DARPA/IPTO Video and Image Retrieval and Analysis Tool (VIRAT) program seeks to detect events and human activities in video streams in real time, and allow content-based search of existing video archives. In recent work, video observables, such as object position and velocity, are transformed into low-level semantic primitives before insertion into their ontological model. This approach may be utilized as one example front-end to the analogical system described herein.

The propositional graph representation and the use of spreading activation (e.g., comparing structural similarity of graphs) are based on those of the Learning and Inference with Schemas and Analogies (LISA) system, as described in "A Symbolic-Connectionist Theory of Relational Inference and Generalization" by Hummel and Holyoak (2003), *Psychological Review*, Vol. 110, No. 2, pp. 220-64 (hereinafter "Hummel03", ), the contents of which are hereby incorporated by reference in its entirety. Also, the propositional graph representation and the use of spreading activation are based on those in an example ARS as described in U.S. Pat. No. 7,599,902 (referred to herein as "Fox07", ), the contents of which are also hereby incorporated by reference in its entirety. The techniques herein, however, go further by replacing the flat semantic layer of previous systems with a hierarchical semantic layer derived directly from the common ontology. One advantage to this is that objects, events, attributes, or states that do not explicitly appear in the ontology (and therefore cannot be selected during annotation), can be represented by a superclass (or parent class), thus preserving some of the intended meaning, as further described below.

As will be described in detail below, one or more embodiments of the invention present a technique for obtaining video annotation metadata, identifying events and objects therein, and associating the events and objects as a predication. As described in more detail below, a predication includes an event predicate (e.g., an activity verb), subject (based on the transitivity of the predicate), and optional prepositional and locative clauses. (Note that there is generally one and only one predication per event.). That is, a propositional graph may be created for each predication by classifying the event as a transitive predicate or an intransitive predicate, and in response to the classification, creating roles (e.g., logical subject/object roles or an intransitive subject role), where the objects (or, alternatively, "role-fillers") may be bound to corresponding created roles for the particular event in the propositional graph. Binding of attributes (e.g., quantity, color, etc.) also takes place, as well as any prepositions to prepositional object roles.

Further, locative relations create adverbial subject roles and adverbial object roles (e.g., of a locative propositional graph), wherein the techniques bind a corresponding event of the locative relation to the adverbial subject role and a corresponding object of the locative relation to the adverbial object role in the propositional graph. Temporal relationships may also be determined when there are a plurality of events, at which time a created temporal object role and temporal subject role (e.g., of a temporal propositional graph) may be bound to respective events (event predications), accordingly. Further details of various embodiments of the invention will become apparent from the description below.

System Architecture

The present invention may generally be considered to be embodied as one of a plurality of aspects. A first aspect is a data processing system having a computer system operating software or in the form of a "hard-coded" instruction set. This system may be incorporated into a wide variety of devices that provide different functionalities. A second example aspect is a method, typically in the form of software, operated using a data processing system (computer), while a third aspect is a computer program product. The computer program product generally represents computer-readable instructions stored on a tangible, non-transitory, computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting the components of a simplified data processing system 100 is provided in FIG. 1. The data processing system 100 comprises an input 102 for receiving information (e.g., annotation metadata) for use in accordance with the techniques herein. Note that the input 102 may include multiple "ports." An output 104 is connected with the processor for providing propositional graphs to a database (casebase), as described below. In particular, the input 102 and the output 104 are both coupled with a processor 106, which may be a general-purpose computer processor or a specialized processor designed specifically for use with the present invention, and which is configured to convert metadata to propositional graphs as described in greater detail herein. The processor 106 may be coupled with a memory 108 to permit storage of data and software to be manipulated by commands to the processor.

Figure 2:
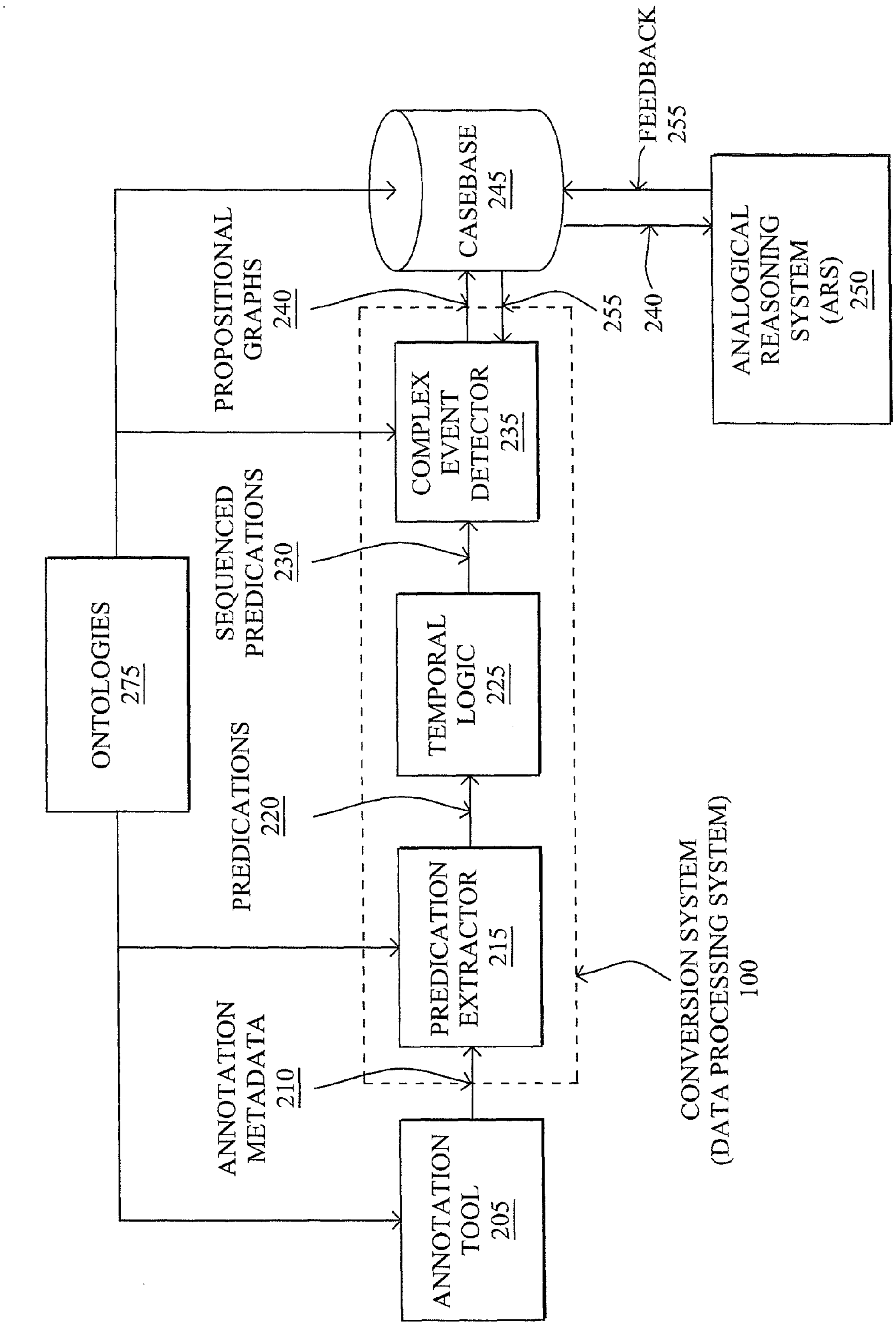
FIG. 2 is an example block diagram of another data processing system.

FIG. 2 illustrates an alternative view of an example data processing system detailing an example simplified processing flow according to the techniques herein. In particular, according to one or more embodiments of the invention described herein, an annotation tool 205 may provide human or computer annotation metadata 210 to a conversion system (e.g., data processing system) 100. In particular, as described below, a human or computer annotates primitive events (i.e., not necessarily related) seen in each video clip, and causal or sequential relationships (when apparent) may be represented in the metadata. Specifically, as described further below with relation to one or more embodiments herein, the use of event predicates and object classes from ontologies 275 in the annotation subsystem 205 (that is, utilizing the ontological semantic layer both for annotating corresponding video and for identifying events and objects within the video annotation metadata) assures compatibility with a semantic layer based on the same ontologies. Note, also, that the semantic layer within ontologies 275 may be formed from the predicates, their Logical Objects and Subjects, object classes, object properties, and all of their super-classes (where all activation flows to a local "Thing" class), as described in greater detail herein. Further, a domain-specific ontology can be formed for ontologies 275 using concepts defined by other more general ontologies, thereby forming a hierarchy. One example ramification of this is an extension to public domain ontologies.

Within the data processing system is illustratively a predication extractor 215 which forms primitive event predications from the event predicates and object instances within the metadata 210 (e.g., with event intervals aligned to a common time base), and provides these time-aligned predications 220 to temporal logic 225. In particular, at temporal logic 225, temporal relationships between primitive event predications are determined, which enables reasoning about events that span more than one field-of-view (FOV) of the video. That is, it determines which temporal relation (e.g., before, overlapping the start, fully enclosed, overlapping the end, etc.) should be used between subsets of predications.

The generated sequenced predications 230 may then be submitted to a complex event detector 235 to create propositional graphs 240. Specifically, primitive event predications are matched to complex event patterns, which form target cases, as described below. Target cases (propositional graphs) are written to the database 245 for analysis by the analogical reasoning system (ARS) 250. Through feedback 255 (e.g., rank order and inferences written back to the database from ARS nodes 250), rankings of the "N-best" cases may be read by the complex event detector 235 from the database, and statistics generated by the ARS may also be used to improve classification performance. Notably, while it is shown herein that the complex event detector reads an n-best list from a casebase, and that the n-best list is stored in the casebase, and that the analysis produces a result in the form of an n-best list, this particular implementation is merely an illustrative example, and is not meant to limit the scope of the invention herein. Note further that as described below, the semantic layer may be replicated on each ARS node to reduce traffic.

As an alternative or in addition, according to one or more detailed embodiments of the invention described herein, the techniques may be designed to be a knowledge-adding service in a cloud architecture. External systems may retrieve video clips from the cloud and ontology specification files from the system described herein, and extract event metadata, for example, represented using VEML and using the primitives defined in the ontology. These metadata files may then be published back to the cloud server. A Syndication Client in the system herein may subscribe to this metadata, and may retrieve the metadata for analysis. An Automatic Proposition Extractor (e.g., conversion system 100, such as predication extractor 215, temporal logic 225, and complex event detector 235) converts the metadata into a model of the dynamic scene represented by propositional graphs of cases that are interconnected through a semantic layer (of roles, role semantic elements and object semantic elements) and represented as database records. These graphs are read from the database by distributed nodes of an Analogical Reasoner. Output, in the form of closest matches and recommendations of additional features that might be in the scene but not correctly detected or classified, are written back to the database. This data may be published back to the cloud by the Syndication Client. The details of the modeling convention used by this system is described in further detail below.

Figure 3:
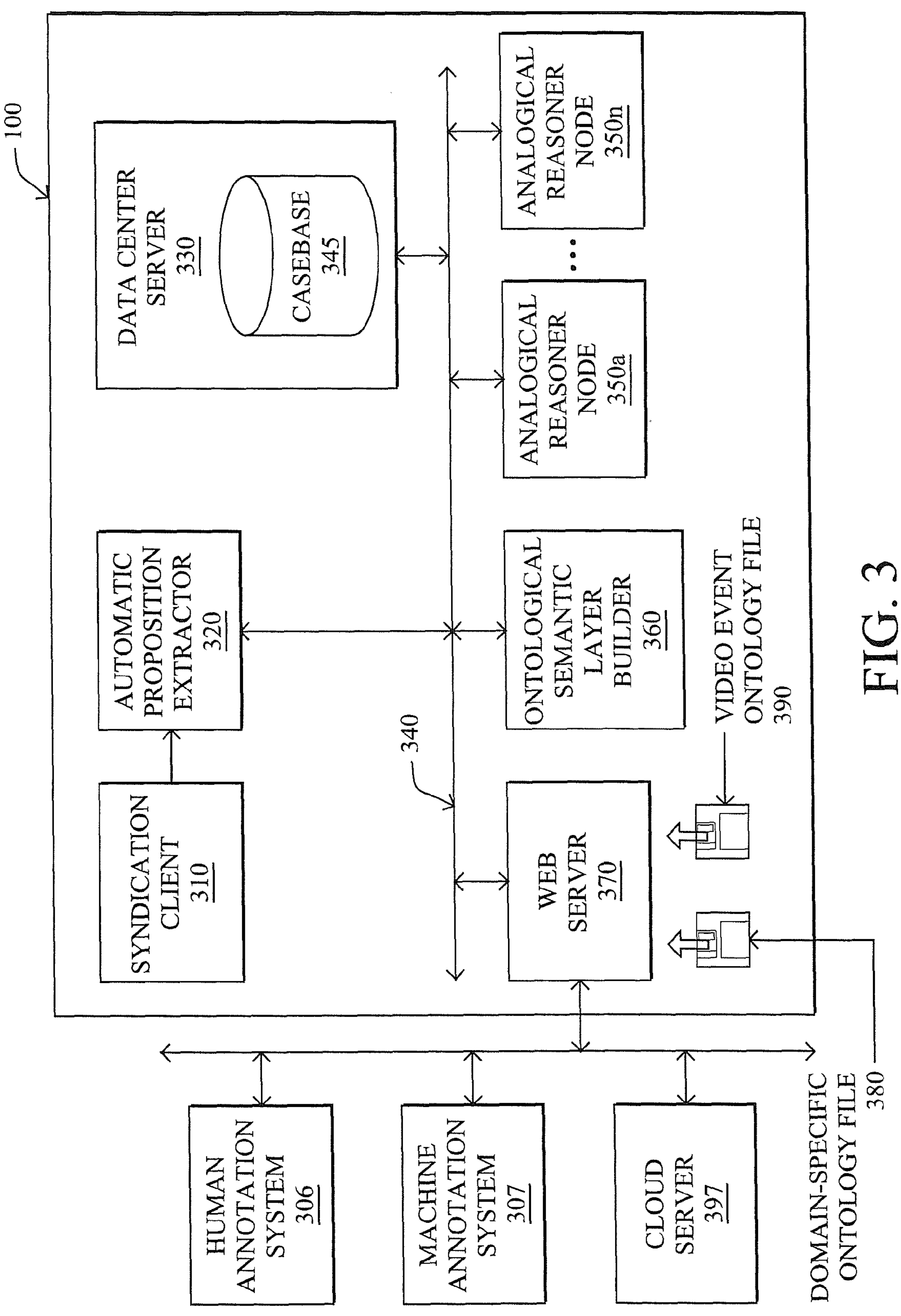
FIG. 3 is an example block diagram of a cloud-based data processing system.

In particular, as described in more detail below, FIG. 3 illustrates an example embodiment of the invention herein, in which a data processing system 100 connects to various annotation systems (205), including a human annotation system 306 or machine annotation system 307, via a network 395. Although two exemplary annotation systems are shown in conjunction with FIG. 3, it should be appreciated that other types of annotation systems may also be coupled to system 100.

Within system 100, a syndication client 310 and a web server 370 connect to external network 395. External network 395 is used to send metadata into and read results from system 100 and to read a domain-specific ontology file 380 and a video event ontology file 390 (generally 275) from system 100 via web server 370. Syndication client 310 is coupled to an automatic proposition extractor 320 (e.g., conversion system 100), and sends it the metadata (210) received from external bus 395.

Automatic proposition extractor 320, data center server 330, web server 370, ontological semantic layer builder 360, and the analogical reasoner nodes 350*a*-350*n* (ARS nodes 250) are each coupled to an internal network 340. Casebase 335 (e.g., 245) resides in storage (e.g., on the disks) of data center server 330, and is accessed and updated by data center server 330 in response to requests and queries from the automatic proposition extractor 320, ontological semantic layer builder 360, and analogical reasoner nodes 350*a*-350*n* via internal network 340.

Annotation Tool

Figure 4:
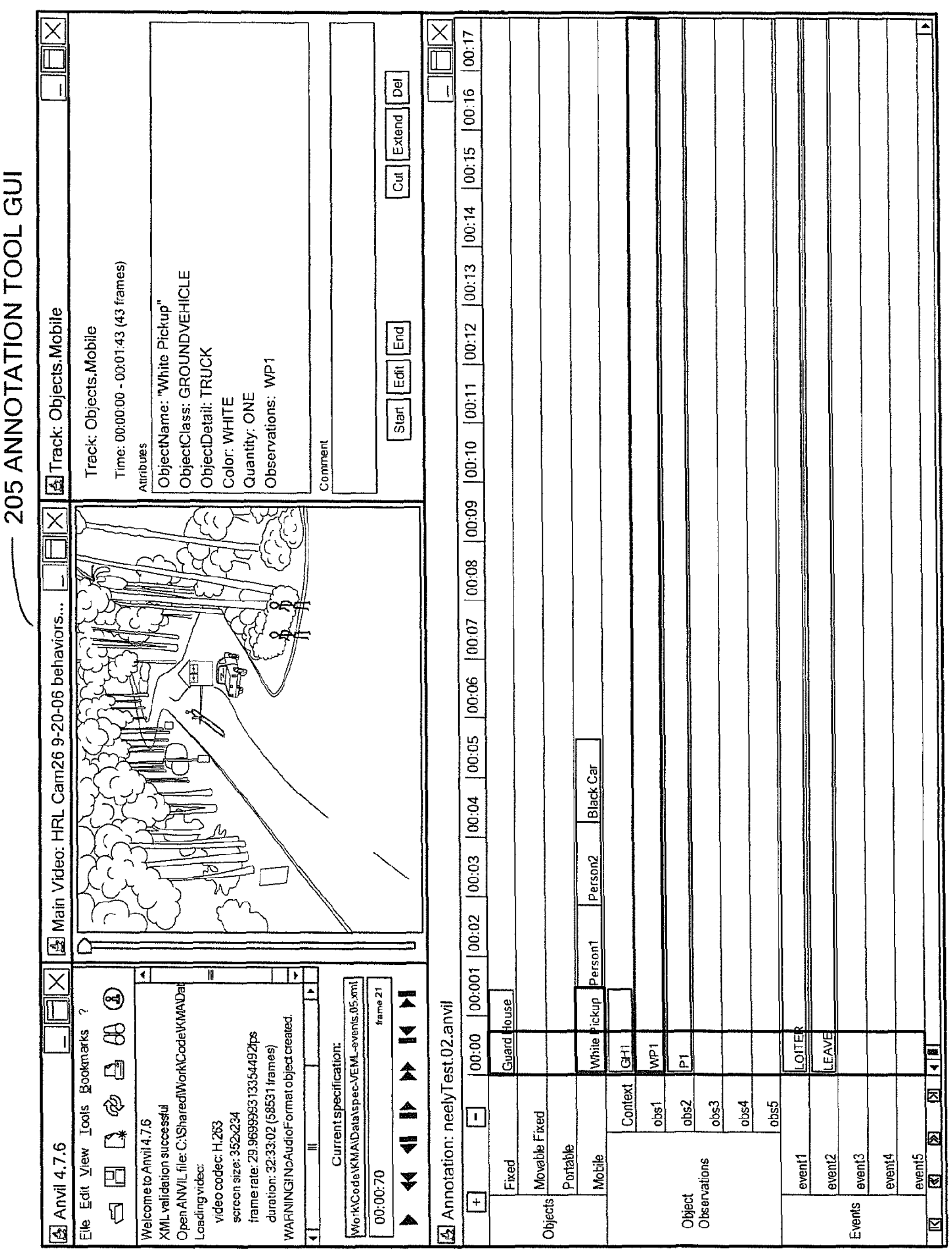
FIG. 4 is an example graphical user interface (GUI) front-end of a video annotation tool.

Though primarily focused on converting metadata-to-propositional graphs, the inventive techniques herein also define a front-end system that may be used for semantically annotating surveillance video as a source of video metadata. FIG. 4 illustrates an example front-end system 205 (e.g., software program/graphical user interface or "GUI") that may be used for semantically annotating surveillance video (e.g., annotating events and the objects involved, such as a human system 306).

As an example, the front-end annotation system 205 may be based upon re-configuring publicly available annotation systems, such as the ANVIL Video Annotation Tool by Michael Kipp et al., available at the time of filing at http://www.anvil-software.de. ANVIL is a video annotation tool which offers multi-layered annotation based on a user-defined coding scheme. During coding the user can see color-coded elements on multiple tracks in time-alignment. Some features of ANVIL are cross-level links, non-temporal objects, timepoint tracks, coding agreement analysis and a project tool for managing whole corpora of annotation files. Other annotation systems may be used, and FIG. 4 (e.g., based on ANVIL) is merely an illustrative example. For instance, the system may be constructed from the open-source Video Performance Evaluation Resource (ViPER) software by the Language and Media Processing Laboratory of the University of Maryland available at the time of filing at http://viper-toolkit.sourceforge.net.

The illustrative front-end system 205 used herein may be adapted (e.g., from ANVIL) to specifically provide sufficient support for documenting known objects in the scene, when these objects enter and exit the field-of-view (FOV) (such that it is understood that it is the same object), and the relationship between the event or action predicate, and the actor and acted upon objects. That is, the system in FIG. 4 enhances the illustrative underlying ANVIL annotation tool such that it a) provides a method for representing the objects in the area, objects visible in the scene, and actions involving those objects, b) writes the annotation to a metadata file (e.g., VEML) representation, and c) enables reconfiguration of the underlying ontology used for annotation through access to a web-accessible (and updatable) ontology. (Note that ontology updates may be performed by other tools and/or systems, such that the annotation tool may access the updated ontology for its use, accordingly.)

Generally speaking, as noted herein, one example goal of video annotation is to allow for the detection of particular behaviors within the video. To this end, FIGS. 5A-B convey various illustrative behaviors that may be detected within a video scene, and their general classification. For instance, FIG. 5A shows an example set of threat behavior cases 505, such as people casing facility perimeters, emplacing objects from/under vehicles, abandoning vehicles, or intruding over fences. FIG. 5B, on the other hand, shows an example set of non-threat behaviors 510 that may be detected, such as deer walking past a parking lot, people parking their cars, and people putting objects in cars in a normal manner. Many other possible behaviors may be detected, and those shown in FIGS. 5A-B are merely a small representative set for the purpose of illustration.

Scene Semantics Modeling Approach

According to the techniques herein, a model consists of Objects, Object Observations, and Events. An "Object" is any tangible entity that is observable at some point in time in the video. Although the Objects herein are instances of an Object type (a class defined by the ontology), the Objects generally don't actually exist in observation space-time until they are instantiated by an Object Observation. There can be a plurality of Object classes, which are all grouped into group "Objects". In the system herein, the following Object classes are used: Fixed, Movable Fixed, Portable, and Mobile. Fixed Objects are immobile and incapable of movement by other than extreme means. For example, a building is generally considered a Fixed Object, unless a bulldozer is present. Movable Fixed Objects are parts of Fixed Objects that are capable of some movement. For example, a gate is a Movable Fixed Object component of a Fixed Object fence. Portable Objects are movable, but have no or very limited locomotion capability. For example, a briefcase is a Portable Object. A Mobile Object has the capability to move itself. For example, a car, human, and dog are Mobile Objects.

In addition, Objects can have a plurality of attributes, which can be assigned and edited for each Object element (e.g., using the capabilities of annotation software, such as described above with reference to FIG. 2). In accordance with one or more embodiments herein, the attributes "Color" and "Quantity" may be used, though many others are possible and reasonable. Note that the encoding of Quantity as an Object attribute should not be taken as a theoretical commitment to a view of quantification, but simply a mechanism of convenience.

An "Object Observation" marks an instance of observation of an Object. This instantiation is indicated herein by interconnecting an Object to an Object Observation, e.g., within the annotation software. An Object Observation must not be linked to more than one Object, however each Object may link to a plurality of Object Observations. There may be considered two classes of Object Observations: "Context" and general. Context Object Observations are observable through the entire video clip, and the length of the graphical element used to represent it in the software display is ignored. Any class of Object can be a Context Object, though there is typically a high degree of correlation between Fixed and Context. General Object Observations are used for Objects that are not observable at every point in the video clip (i.e., they are only observable for some portions), and the length and location of the element with respect to the timeline indicates the time in which the Object is observable in the video. A given Object can have a plurality of Object Observations. For example, a dog entering and exiting the field-of-view (FOV) will be annotated using a different Object Observation for each span of time it is observable, all linked to the same Dog Object. If another dog entered the FOV, it would require not only its own Object Observation, but also its own Dog Object declaration. So, the division between a given pair of Object declarations and Object Observations is not a type-token distinction, but rather a division between the Object token and an appearance (or multiple appearances) of that Object token within the video clip.

An "Event" is any action or state change that occurs to an Object represented in an Object Observation. Object Observations involved in the Event are "linked" to the Event, in the proper role (e.g., by editing properties or attributes of an object within the annotation software tool 205). Roles that an Object Observation can have in an event are: Transitive Subject, Intransitive Subject, Transitive Object, Prepositional Object, and Locative Object. In particular, the embodiments herein distinguish Transitive and Intransitive Subjects because Events can be "Transitive", having a Subject and a Direct Object, or "Intransitive" having only a Subject. The Subject is the actor of the action or effector of the state change and is generally the most salient entity in Transitive Events, through in Intransitive Events, the Intransitive Subject may also have the role of affected object.

As will be discussed below, it is expedient to distinguish Intransitive and Transitive Subjects. The Direct Object in a Transitive Event is usually the entity acted upon, and it is referred to herein as the "Transitive Object". The Prepositional Object is an Object Observation that has a role in the Event that is typically expressed in normal English via a preposition, such as "with a stick". The Locative Object is an Object Observation which typically conveys information that locates the Event in the overall FOV space, such as "by the road". Prepositions and Locative Relations are supplied by the ontology and selectable by the user (or system) when editing the Event element using the annotation software. Generally speaking, these five relations (Transitive Subject, Intransitive Subject, Transitive Object, Prepositional Object, and Locative Object) can express the essential elements in a given Event captured in video.

Note that as used herein the terms "Logical Subject" and "Logical Object" may be applied to the roles of Transitive Subject and Transitive Object (also called "Direct Object"). Although this is slightly redundant, it is helpful in maintaining clarity in descriptions involving both Object Observations and the grammatical roles of Object and Subject. Although in human language, descriptions of events frequently include more than just these five relations (as in a sentence like "John saw the boy on the hill with a telescope using binoculars with night vision"), an assumption made in the embodiments of the invention herein is that the more minimal set will suffice for the vast majority of cases found in surveillance video, at least for the purposes of unambiguously identifying events within the video. Note that these five relations are merely an example, and may be extended with additional relation types, while preserving the annotation semantics described herein, such as for the purposes of searching through a large archive of video events or of complex inference and reasoning.

Said differently, according to one or more of the embodiments herein, up to six arguments may provide an event type-specific mapping to Objects and relations. In particular, FIGS. 6A-B show a pair of tables, Table 1 and Table 2 (respectively), which illustrate the arguments described above based on the type of event predicate. For instance, Table 1 of FIG. 6A illustrates an example meaning of the six arguments as a function of predicate type, while Table 2 of FIG. 6B illustrates some examples of parsing statements into predicates and these arguments. Those skilled in the art will appreciate that the mapping of prepositions and locative relations as arguments (e.g., ARGs as mapped to a VEML representation) is merely an illustration, and is not meant to limit the scope of the embodiments herein.

It should be noted that the use of linguistic relations to partially structure semantics of video metadata has not been often used. This is due, at least in part, to the fact that it is video that is being analyzed, indexed, and searched and not textual or speech data. Also, video data has often been tagged with naïve semantic labels, but the labels are not structured in a way that is motivated by linguistic semantic principles. This is due not only to the fact just mentioned (i.e., of the target data being video, and not linguistic data), but also to the fact that the majority of people setting up annotation schemata, indexes, taxonomies, etc., are not oriented to the inherent structure of natural language syntax and semantics. The techniques herein, however, organize the video analysis semantics based on such linguistic relations.

Although there are some linguistic semantics that have made their way into video annotations efforts, such as is found in the ARDA workshop proceedings (Bolles, B., R. Nevatia (2004); 2003 *ARDA Event Taxonomy Challenge Project, Final Report,* Feb. 9, 2004, hereinafter "Bolles04", ), such semantics are notions such as "actor" and "patient" (i.e., one acted upon), which do not generalize as readily to many events, such as intransitive predications like a man falling from a roof. If all that is visible is the person falling, with no obvious cause, it may be unclear whether the person is an "actor" or a "patient". Moreover, there are even many transitive predication participants that are not clearly characterizable as actors and patients (such as in a case of a person noticing someone or something). In such cases, our usage of notions of Logical Subject, Logical Object, Intransitive Object, and Prepositional Object (also called "Oblique Objects" elsewhere), which are more general cover terms based on the general semantics associated with syntactic configurations in natural language grammar provides a superior solution.

One advantage of the Logical/Transitive Subject, Intransitive Subject, Logical/Transitive Object, Prepositional Object, and Locative Object concept herein is that it provides a generalized categorization of semantic objects that simultaneously: (a) frees a developer and an annotator from having to determine which of some more specific richer set of semantic roles should be assigned to particular participants in a scene, whose specific roles may not be completely obvious, and (b) does not misuse certain semantic role labels (like "agent", "actor", and "patient"). On the second point, these labels are often used in such a way that they are so bleached of their originally intended use as to become almost meaningless. The first point (a) may not seem to be a problem on the face of it, but when annotators, especially annotators without a great deal of training and experience, are faced with deciding which of some rich set of semantic roles should be assigned to a given participant in a scene, they will typically be inconsistent, both among different annotators, and even for a given annotator's tags in a tagged video corpus. In short, the roles identified are both accurate and coarse-grained enough so as to allow for consistent use among annotators.

Also in accordance with the concepts, systems and techniques described herein, the fact that the use of coarse-grained syntactico-semantic linguistic concepts improves the accuracy and consistency of human video annotation is an unexpected result. The reason this result is unexpected is as follows. Generally, one wants to use "lay-people" (i.e., people who are not syntax/semantics experts) as annotators. It is generally expected that lay-people will have better intuitions about semantically-rich labels than syntactic labels, because semantic distinctions are more meaningful and intuitively accessible than syntactic ones, by definition. Semantics is all about meaning, while syntax is essentially about graph configurations, which is something that is not intuitively accessible. Thus, one would expect semantically-rich labels like agent, patient, recipient, goal, beneficiary, and the like to be more readily usable by an annotator than labels like subject of transitive, subject of intransitive, object of transitive, prepositional object. However, experiences in this area have shown that it is the contrary.

It is believed herein that the reason for this has to do with the difficulty annotators have in correctly attributing certain psychological states to participants in events. Consider a video clip that includes a person falling face-down onto the ground. The annotator faced with the choice of determining which of a set of SEMANTIC roles to use will need to decide whether the person fell on purpose (in which case they will need to use some version of a "fall" or "drop" event with an Agent participant) or whether they fell by accident (in which case they will need to use some version of a "fall" event with either a patient or perhaps theme (object in motion) participant). Since it is often very difficult to determine intentionality of people just based on the external observations without audio (what is typically available in surveillance video), the annotator has to make a determination using their own skill in making inferences about possible motivations and other pragmatic factors. Because of this, there is going to be much more variability among different annotators and even within a given annotator's labels over time.

By contrast, for an example like an event that might be described by any of the following, an annotator using the quasi-syntactic labels described herein would have a simple choice: is "the man" the subject of a transitive predicate, the subject of an intransitive predicate, a direct object or a prepositional object?

The man fell from the roof.

The man jumped from the roof.

The man slid off the roof.

The man stepped off the roof.

The man stumbled off the roof.

With only very minimal training, most annotators will be able to determine at once that "the man" is the subject of an intransitive, since all of the predicates in these examples are intransitive (i.e., no direct object). The annotator does not need to worry about whether the man is acting purposefully or not.

Ontological Case Representation

According to the techniques herein, the video annotation metadata (210) is converted into "target cases", which may be written to the casebase 245. (Alternatively, target cases may be directly written to the ARS 250.) With respect to a method used in the system, the casebase 245 stores known "source cases" and the DOSL (ontologies 275), which are loaded into local memory of the analogical reasoner nodes 250/350 at system start-up time. In system execution, target case metadata is fed to the system via the syndication client 310 or other means, and the system matches each target case to the most similar source case by the method described below. Metadata is returned from the matching source case that allows access to more detailed metadata describing the case, and to the original source video from which the metadata was generated through an annotation process.

In the system and techniques described herein, a "case" represents a "Complex Event" using the terminology of Bolles04 (the term "case" is used herein as in "case-based reasoning" and not in reference to the linguistic sense of "case relations/roles"). A Complex Event is a time-ordered sequence of "Primitive Events". Each Primitive Event is represented as a "predication". A predication consists of an event predicate (a typical example of which we would call an "action verb" in English) and the associated subject, direct object (if any), prepositional relation and object (if any), and locative relation and object (if any) used to express an assertion about an event. We model the event predicate, subject, object (if any), prepositional relation and object (if any) using an Event Propositional Graph. To convert these predications into the propositional graphs used in the ARS, we model the locative relation and object (if any) using a Locative Propositional Graph, in which one of the objects is an Event Propositional Graph. In addition, we model the temporal relationship between predications using a Temporal Prepositional Graph, in which both objects are Event Propositional Graphs. (FIG. 11 described below shows the relationships between these graphs.)

One example prior art system that analyzes propositional graphs is the Semantic-based Hybrid Architecture for Analogical Reasoning (SHAAR) of Fox07, which is a general purpose analogical reasoning system from which certain embodiments of the present invention may be considered an enhancement and/or extension. SHAAR uses a symbolic-connectionist model of structure mapping that employs a distributed representation of objects and predicates for use in a wide range of domains. SHAAR allows a user to solve problems of much greater size than other existing devices.

Potential applications for SHAAR include adaptive and autonomous control for robot/unmanned vehicles, strategic intelligence for agents and entities in simulation and virtual training environments, and decision support or agent development for intelligence applications.

SHAAR's partial propagation in its neural network, controlled activation flow, and non-temporal activation multiplexing provide performance advantages. Additionally, SHAAR uses a sophisticated symbolic-connectionist model of structure mapping that employs a distributed representation of objects and predicates. Most other relevant reasoning models use other methods to perform mapping and are incapable of solving many classes of analogical reasoning problems that can be solved by SHAAR.

To assist in understanding SHAAR's operations, SHAAR uses naming conventions in its network structure. FIG. 7 depicts the naming conventions assigned to various nodes. As can be appreciated by one skilled in the art, the naming conventions used herein are for illustrative purposes only and can be changed so long as they nodes they represent perform similar functions as described herein and are entities capable of having activation.

SHAAR handles information in the form of propositional statements, or predicate calculus. The model can reason about objects that enter into arbitrarily complex relations (relations with one or many arguments) and allows relations to hold between propositions, as well. The ability to represent and reason about nested propositions (relations between relations, or facts about facts) greatly extends SHAAR's abilities. The general logic of predicate calculus is reflected in the network architecture of the model.

Statements in predicate calculus are composed of symbols, and these symbols maintain their individual meanings across any statement into which they enter. That is, the meaning of the individual symbols is independent of the larger statement they comprise. As such, SHAAR employs nodes that represent objects 710 and predicates 702 independently of how these are bound together (these nodes are called OP units 704, with OP standing for Object/Predicate). For example, the statement "John loves Mary" employs units representing "John," "lover," "Mary," and "beloved." These are the same units that would be involved in the statement "Mary loves John," and they are a subset of the units that would comprise the statement "John and Mary love spaghetti." The instantiation of independent representations of objects and predicates is crucial to performing abstract relational reasoning, inference, and learning. However, it is not the only requirement.

SHAAR also builds units that correspond to complete propositional statements (Prop units 706). The instantiation of a single "handle" for each complete statement enables SHAAR to (1) act upon entire statements via this "handle," and (2) use propositional statements as arguments for other statements. Both of these are useful during reasoning and inference.

Note that the existence of Prop units 706 and OP units 704 is insufficient to completely capture statements in predicate calculus. Humans do not routinely use symbols that indicate which arguments play which roles in a relation, instead they rely on the order in which arguments are listed. Because a network has no notion of written order, some other mechanism must provide explicit, unambiguous information about the roles played by the various arguments of a proposition.

Given a set of symbols (OP units 704) that may be formed into a propositional statement (Prop units 706), SHAAR needs to bind the appropriate objects to the roles they play in that statement. SHAAR creates explicit (conjunctive) representations of role-filler bindings. These conjunctive units are called Sub-Propositions (SP units 708). If the network includes a proposition "John loves Mary," then the explicit role-filler bindings that are comprised by that statement are "John"+"lover" and "Mary"+"beloved." SHAAR creates SP units 708 one level above the OP units 704 in the network hierarchy, which have links to the appropriate OP units 704 being bound. Any proposition utilizes a set of SP units 708, one for each argument entering into the proposition.

The components of a single propositional statement are all made explicit as part of SHAAR's network representation. At the top level are Prop units 706, which represent conjunctions of SP units 708, one level down. SP units 708, in turn, represent conjunctions of OP units 704 (specifically, each SP unit 708 is a conjunction of one predicate unit 702 and its argument-an object 700 or Prop unit 706). OP units 704 represent conjunctions of semantic units 710 that describe the content or features of the OP units 704. The semantic units 710 include predicate semantic nodes 712 and object semantic nodes 714. Semantic units 710 are discussed in further detail below.

Other analogical reasoning systems, such as Learning and Inference with Schemas and Analogies (LISA), use synchrony of neural firing to encode information about the roles being played by the objects in any specific situation. For example, "Bill" is represented in the same way whether he is jumping or running, but the temporal pattern of firing is such that the "Bill" neurons fire in synch with "Jumping" neurons in the former case, and "Running" neurons in the latter.

Hebbian learning algorithms are relatively straightforward to those skilled in the art. The connection strengths between units that fire together in time increase over the course of learning. Because SHAAR employs multiplexing across its activation vectors, the equivalent of Hebbian learning may occur as a single vector operation. The activation vectors of two units may be multiplied (or correlated), the result used to adjust the strength of the connection between them. The resulting activation on a node is the sum of all contributing input nodes normalized by the max value after all inputs are evaluated. In particular, the correlation between two nodes is the scalar product of their activation vectors.

A fundamental goal of SHAAR is to find correspondences between a novel situation (a target problem/case) and a known situation (a source problem/case). These correspondences may stem from relational symmetries, object similarities, or a combination of the two. SHAAR looks for the best mapping connections by producing a matrix of unit correlations and accepting the strongest internally consistent set.

Returning to the discussion regarding the present invention, the event ontologies are a significant and unifying core of the concepts, systems and techniques described herein. A video event ontology file 390 is prepared that contains event predicate, object class, semantic role, and locative relation concepts relevant to surveillance scenes and may be formatted in the Web Ontology Language (OWL) (Herman, I. (2007). *W3C Semantic Web: Web Ontology Language* (OWL), OWL Working Group, 6 Sep. 2007, http://www.w3.orq/2004/OWL). Event predicate concepts describe actions that are observable. A domain specific ontology file 380 is prepared that contains event predicate, object class, semantic role, and locative relation concepts that are specific to the domain of surveillance, is formatted in OWL, imports the video event ontology file 390, and uses or extends base concept classes from the video event ontology file 390. Both ontology files reside on the web server 370, which provides access via Hypertext Transfer Protocol (HTTP) (Lafon, Y. (2008). *HTTP—Hypertext Transfer Protocol*, W3C Architecture Domain, http://www.w3.orq/Protocols/.) functions by subsystems on either the external network 395 or internal network 340.

The ontological semantic layer builder 360 reads the domain specific ontology file 380 (which in turn imports the video event ontology file 390) and creates the ontological semantic layer graph and writes the vertices and edges of this graph to the casebase 335 (245). To facilitate the automatic construction of propositional graphs from video metadata, the ontological semantic layer graph uses a novel approach to modeling event predicates. The concepts, systems and techniques described herein build on the original LISA approach for representing predicates in propositional graphs described in Hummel03, as well as those in Fox07. In LISA, each proposition is divided into subpropositions representing the actor role, the acted upon role, and any other semantic role, such as a preposition. So, for example, the proposition "The driver (of a truck) extracts an object/item from the pickup truck" yields semantic roles: driver as "extractor" (the Subject role), object/item as "extracted" (the Object role), "from" as the Preposition, and "pickup truck" as the Prepositional Object. In a LISA propositional graph, role semantics are connected to roles "extractor", "extracted", and "from" and object semantics are connected to Objects "Driver", "object/item", and "pickup truck".

Using "Logical Subject" and "Logical Object" concepts understood in the art (e.g., from Marantz, A. P. (1984) *On the*

*Nature of Grammatical Relations*, MIT Press, Cambridge, Mass.), we say that "extractor" is the Logical Subject of the predicate "extract" and, because "extract" is a transitive predicate, "extracted" is the Logical Object. However, note the irregularity of the form of these roles. Using the concepts, systems and techniques described herein, the pattern for these roles has been regularized and abstracted so they can be automatically produced by a computer from the predicate. For each transitive predicate called "<predicate>", we create a Logical Subject called "<predicate>_LS" and a Logical Object called "<predicate>_LO". For intransitive predicates, we derived an "Intransitive Subject" (e.g., from Comrie's discussion of Nominative-Accusative versus Ergative-Absolute systems, Comrie, B. (1982). *Language Universals and Linguistic Typology*, University of Chicago Press, Chicago, Ill.). So, for each intransitive predicate, we create an Intransitive Subject called "<predicate>_IS". When these subjects and objects are used for the roles, essentially making roles part of the semantic layer, the ontological structure in which they reside becomes the role semantics. This is an important innovation over prior art systems in which an arbitrary set of concepts were created and used for the role semantics. One advantage of the concepts, systems and techniques described herein is that if the exact desired predicate does not exist in the semantic layer, a superclass predicate can be used, and the role semantics are assured of being similar to those corresponding to the exact desired predicate, preserving some of the intended meaning. This regularization approach also provides an easily parsed unique name that can be incorporated into the OWL ontology. We do so by creating properties for the transitive and intransitive event predicates, as shown in FIGS. 8 and 10. FIG. 9 shows an example of the declaration of the "Extract" event instance (called an "individual" in OWL terminology) with its logical subject and location object as OWL object properties.

Figure 11:
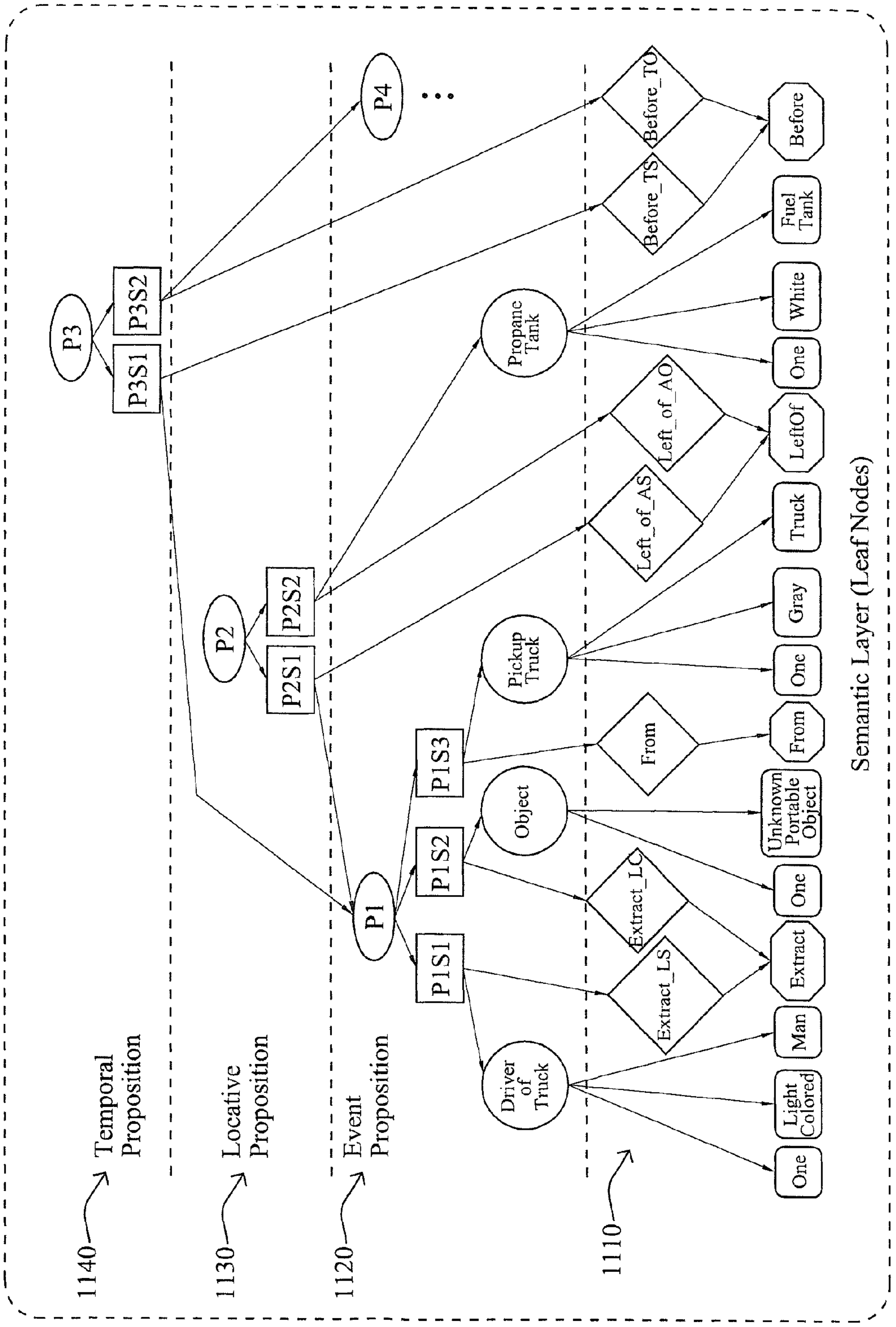
FIG. 11 is an example set of Propositional graphs for the predication: "Truck driver extracts an object from a pickup truck to the left of a propane tank before <P4>"

FIG. 11 shows the set of propositional graphs for the predication "A light colored man extracts an unknown object from a gray truck to the left of a white fuel tank before <P4>" where <P4> is the next predication in the sequence after <P1>, each an Event Propositional Graph (EPG) 1120. Note how roles "Extract_LS" and "Extract_LO" connect to predicate "Extract" in the ontological semantic layer 1110. Note also that objects are handled by connecting to object classes and object property classes defined in the ontology, a fragment of which is shown in FIG. 10. (Note further that the object semantic vertex "one" is replicated to avoid clutter in the Figure, i.e., there is generally (e.g., always) only one such vertex in the semantic layer 1110.)

In accordance with the concepts, systems and techniques described herein, prepositional relationships are handled as just another semantic relation in the proposition. This means, one can add a subproposition to bind the preposition to the prepositional object. An example can be seen with the preposition "From" in FIG. 11 from subproposition <P1S3>.

Locative relationships place the event in the physical context of the scene. In accordance with the concepts, systems and techniques described herein, locative relationships are modeled using the Locative Propositional Graph (LPG) 1130. In the LPG, the object with the subject role is actually another proposition: an Event Propositional Graph (EPG) 1120 (<P1>). A structure called "Prop2" in the database schema may be used to store LPGs. One innovation of this system is the Prop2 data formalism, as shown in the database schema in FIG. 14 (described below), and the capability to store and retrieve Prop2 structures from the casebase 335/245.

Figure 14:
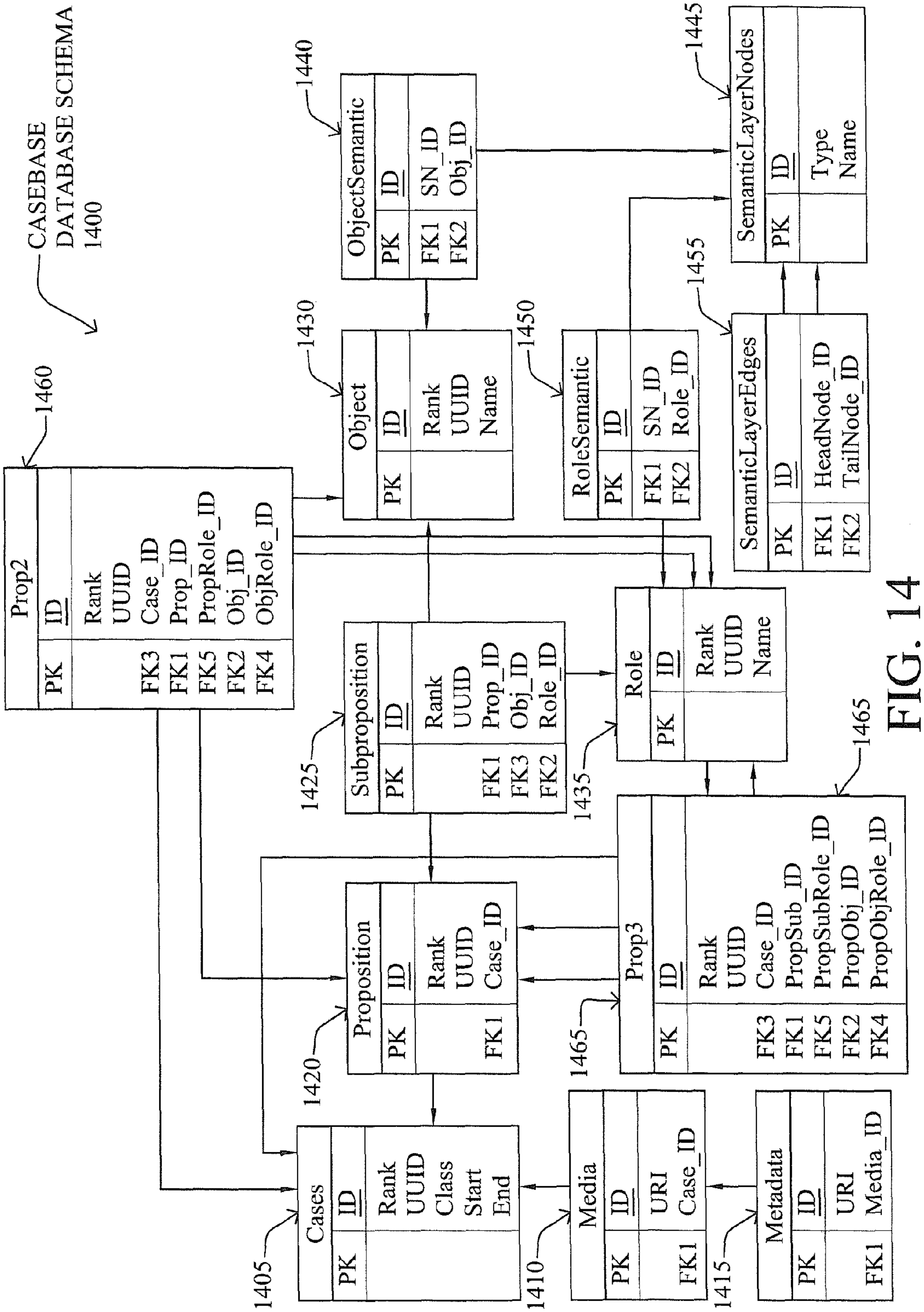
FIG. 14 is an example database schema for a casebase.

Another innovation of the concepts, systems and techniques described herein is the generalization of adverbial subjects and objects for locative relations in the same way as was discussed above for logical subjects and objects. FIGS. 12 and 14 show how OWL object properties were used to structure these semantic roles in the ontology.

Temporal relationships place the event in the temporal context of other events in the video sequence. In the concepts, systems and techniques described herein, temporal relationships are modeled using the Temporal Propositional Graph (TPG) 1140. In the TPG, both the object with the subject role and the object with the object role are Event Propositional Graphs (<P1>and <P4>, respectively). A structure referred to as "Prop3" in the database schema is used to store TPGs. One innovation of this system is the Prop3 data formalism, as shown in FIG. 14, and the capability to store and retrieve Prop3 structures from the casebase 335/245.

Another innovation of the concepts, systems and techniques described herein is the generalization of stative subjects and objects for temporal relations in the same way as was discussed above for logical subjects and objects. FIGS. 13 and 14 show how OWL object properties were used to structure these semantic roles in the ontology.

Casebase Structure

The data center server 330 runs a database management system that services requests and queries from the other subsystems. FIG. 14 shows an illustrative schema design 1400 for the database that forms casebase 335/245. Those skilled in the art will appreciate that the visualization of the database/casebase is merely an example, and that other visualizations, as well as organizations, may be used in accordance with the techniques described herein. Note that a "primary key" or "PK" is a value used to index entries within that particular table, while a "foreign key" or "FK" is a value used to index entries within another table (i.e., as that other table's primary key). For example, a foreign key "FK2—Role_ID" would index into the "Role" table as a primary key "ID".

As an outline to the details described below for FIG. 14, each row of the SemanticLayerNodes table maps to a vertex on each node, and is populated from the OWL domain specific (and VERL) ontologies 275. Rows in the Cases, Proposition, Prop2, Prop3, Role, and Object map to vertices that are distributed across nodes. For the distributed rows, the rank of the node and universally-unique identifier (UUID) for the vertex are stored in the table. The Prop2 table represents propositions consisting of a proposition and an object (Locative Propositional Graphs), and the Prop3 table represents propositions consisting of two propositions (for Temporal Propositional Graphs).

The Cases table 1405 is the main table that defines each case. Since multiple media resources can depict the events that form each case, the Media table 1410 contains a column for the media resource universal resource identifier (URI) and a foreign key linked to the Cases primary key. Similarly, multiple media resources can be annotated in each metadata file, so the Metadata table 1415 contains a column for the metadata URI and a foreign key to the Media table. Note that those skilled in the art will understand that additional columns can be used in the Media table (e.g., in_point, out_point, etc.) to aid in extracting the media resource from a larger media clip represented by the URI.

The Proposition table 1420 defines Event Proposition Graphs (EPGs). Since a case can have several EPGs, the Proposition table contains a foreign key linked to the Cases primary key.

Since each EPG can have multiple subpropositions (typically 1-3), the Subproposition table 1425 contains a foreign key that links to the Proposition primary key. Since there can be only one object and one role per subproposition, the Subproposition table also contains foreign keys to the Object primary key for Object table 1430 and Role primary key for Role table 1435.

The ObjectSemantic table 1440 implements many-to-many bindings between rows of the Object table 1430 and the rows of the SemanticLayerNodes table 1445, so it contains foreign keys that link to the primary keys of both of those tables. An analogous relationship exists between the RoleSemantic table 1450, Role table 1435, and SemanticLayerNodes table 1445. Both role and object semantics are stored in the SemanticLayerNodes table. The SemanticLayerEdges table 1455 represents the many-to-many edges that can exist between the vertices of the semantic layer. Note that the Name columns in the Role and Object tables are only provided for diagnostic convenience (so the tester can determine which instance is intended), because the system and ARS algorithm generally only depend on the role type, object type, and other object properties.

The Prop2 table 1460 handles the situation in which one of the objects is actually a proposition, as happens in Locative Propositional Graphs. Foreign keys for both roles are present. Similarly, Prop3 table 1465 handles the situation in which both of the objects are actually propositions, as happens in Temporal Propositional Graphs.

Each table that actually maps to a distributable vertex in the graph (i.e., Cases, Proposition, Prop2, Prop3, Subproposition, Role, and Object) includes columns for Rank (the processor/node ID) and UUID (the assigned identifier for the vertex). The values for these columns are updated when a processor claims a vertex. In the current implementation, these assignments are persistent from run to run, however one of ordinary skill in the art will see that this does not have to be the case.

Processing of Metadata

Referring again to the example data processing system 100 of FIG. 3 (cloud-based computing) with regard to processing of the metadata, syndication client 310 periodically polls cloud server 397 to retrieve a metadata feed file to hand off to the automatic proposition extractor 320. One of ordinary skill in the art will see that either the file contents or a URL to the file could be provided, depending on the support provided by cloud server 397, and be correctly handled by syndication client 310. Note also that the ontological semantic layer may be obtained from a cloud server 397.

Automatic proposition extractor 320 receives the metadata from syndication client 310. In the one embodiment, the metadata is represented in the Video Event Markup Language (VEML), Video Event Representation Language (VERL), or any other video annotation metadata standard that provides the same expressive capabilities, such as MPEG-7. In training mode, the metadata will be understood to represent a source case or portion of a source case (thus storing a resulting propositional graph as a source case), and classification identification will be provided with the metadata. In detection mode, the metadata will be understood to be a target case or portion of a target case (thus storing a resulting propositional graph as a target case), with the objective of determining the closest classification using the source cases in the casebase 335/245. That is, as described herein, for target cases, the target case may be compared to a plurality of source case propositional graphs, and matched to a most similar source case (e.g., as obtained from a cloud server) Note that Fox07 describes various algorithms for inferring the presence of missing predicates in the propositional graph of a target case using the most similar source case. In certain embodiments herein, when a target case is found that has low similarity to the source cases in the casebase, the target case may be added to the casebase if there is enough information about it (e.g., an interactive function).

Processing the metadata (for training mode to create source cases or for processing target cases) proceeds as follows, with particular reference to FIGS. 15-23.

Figure 15:
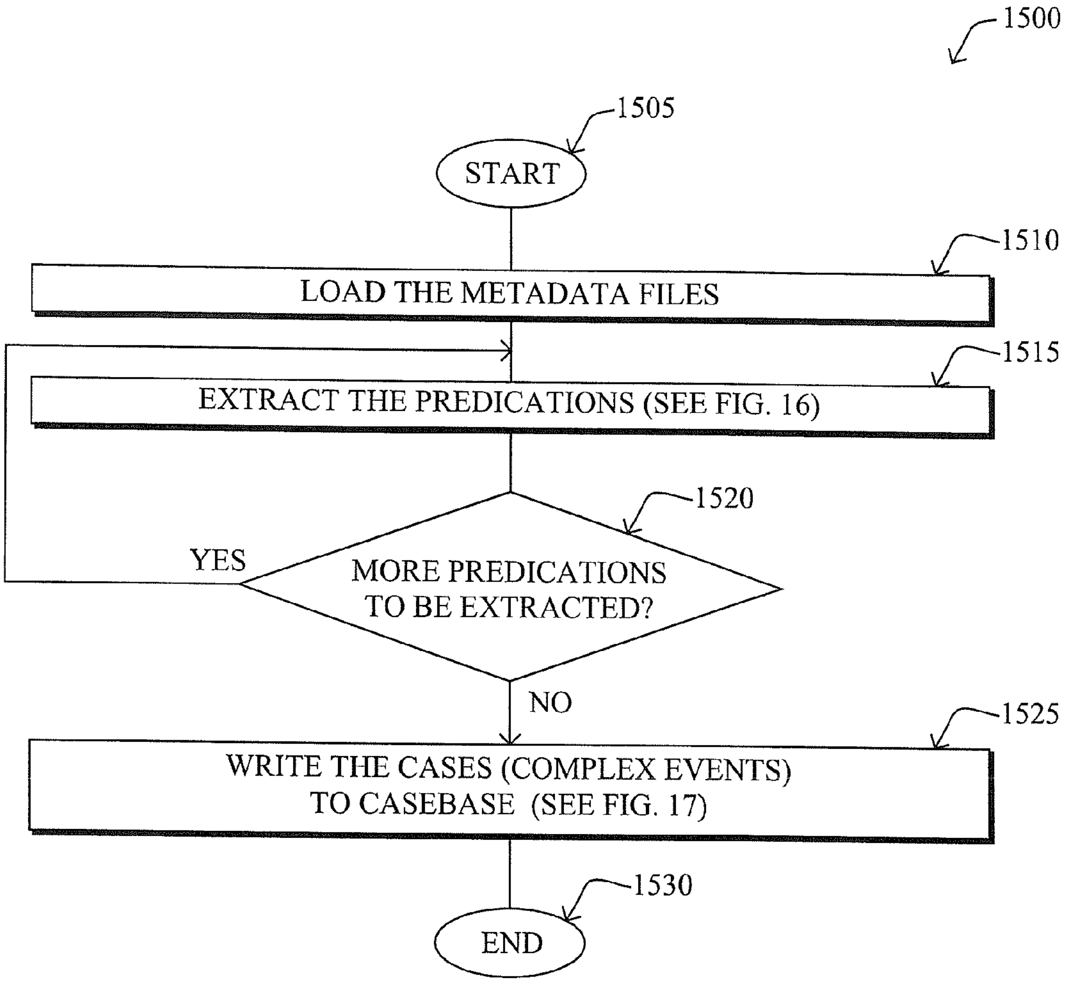
FIGS. 15-23B illustrate example procedures for converting annotation metadata to propositional graphs in accordance with the techniques herein.

Illustratively, FIG. 15 demonstrates a high-level procedure 1500 for processing metadata in accordance in one or more embodiments herein. For instance, the procedure starts at step 1505, where in casebase 335, all tables are dropped except for the semantic layer tables, and new empty tables are created for each table that was dropped. Also, a list may be loaded from a file or other source where each element includes the URL of a metadata file of the training set and its classification. For each element in the list (each metadata file), in step 1510 the system 100 loads the metadata files (thus obtaining video annotation metadata), such as by reading the VEML text indicated by the URL from web server 370 and unmarshalling the VEML data from its XML representation. In step 1515, the predications may be extracted from each set of VEML data. The extraction in step 1515 is described in greater detail in FIG. 16.

Figure 16:
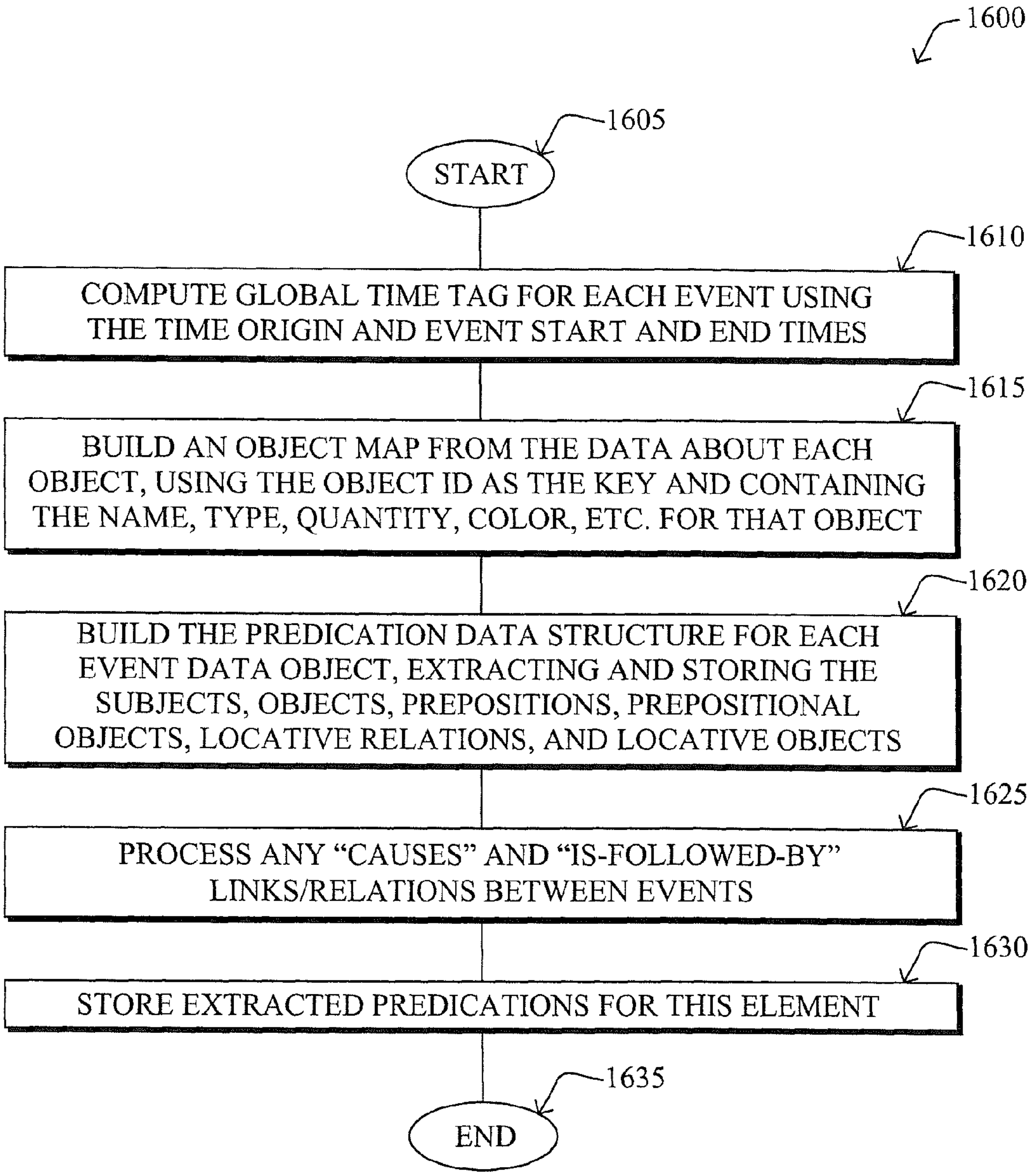

Referring briefly to FIG. 16, the procedure 1600 for extracting predications starts at step 1605, and continues to step 1610, where a global time tag for each event is computed using the time origin and event start and end times. In the preferred embodiment, this global time is a 64-bit integer representing the number of milliseconds since the start of the epoch (midnight, Jan. 1, 1970) that is used internally by Java. In step 1615, an Object Map is built from the data about each object, using the object ID as the key and containing the name, type, quantity, color, etc. for that object (i.e., Objects are associated with Object Maps containing a plurality of attributes of a particular corresponding Object). Further, in step 1620, the system builds the Predication data structure for each event data object, extracting and storing the subjects, objects, prepositions, prepositional objects, locative relations, and locative objects (in other words, identifying one or more events and one or more objects within the video annotation metadata, and associating one or more of the identified objects with each identified event as a corresponding predication). Note that for the object data, more than one may be present, and the actual value of each must be found by indexing into the Object Map using the object ID stored in the event data object. In step 1625, the system processes any "causes" and "is-followed-by" links/relations between events ("causes" implies a high certainty about causation between two events, e.g., "vehicle strikes fire hydrant" causes "fire hydrant spouts water", while "is-followed-by" implies an apparent sequence of events for which causality is not perspicuous or indicated, e.g., "person A unlocks door with key" may be part of a sequence prior to "person A opens door" and then "person A enters door"). The extracted predications may then be stored for this element in step 1630, and the procedure 1600 ends in step 1635.

Referring again to FIG. 15, procedure 1500 continues from extracting the predications in step 1515 to determine in step 1520 whether there are predications to be extracted from additional metadata files, possibly from annotation of multiple FOVs, and if so, the procedure returns to step 1510. These predications can be arranged in a reasonable temporal order and grouped into cases. In one embodiment, the implementation takes only one metadata file, and orders predications based on event start time, however there are many other methods that can be used to organize predications into cases. Once there are no further metadata files in step 1520, the procedure continues to step 1525 to write the cases (Complex Events) to casebase 335 for each type of Complex Event as described further in procedure 1700 of FIG. 17, and the high-level procedure 1500 ends in step 1530.

Figure 17:
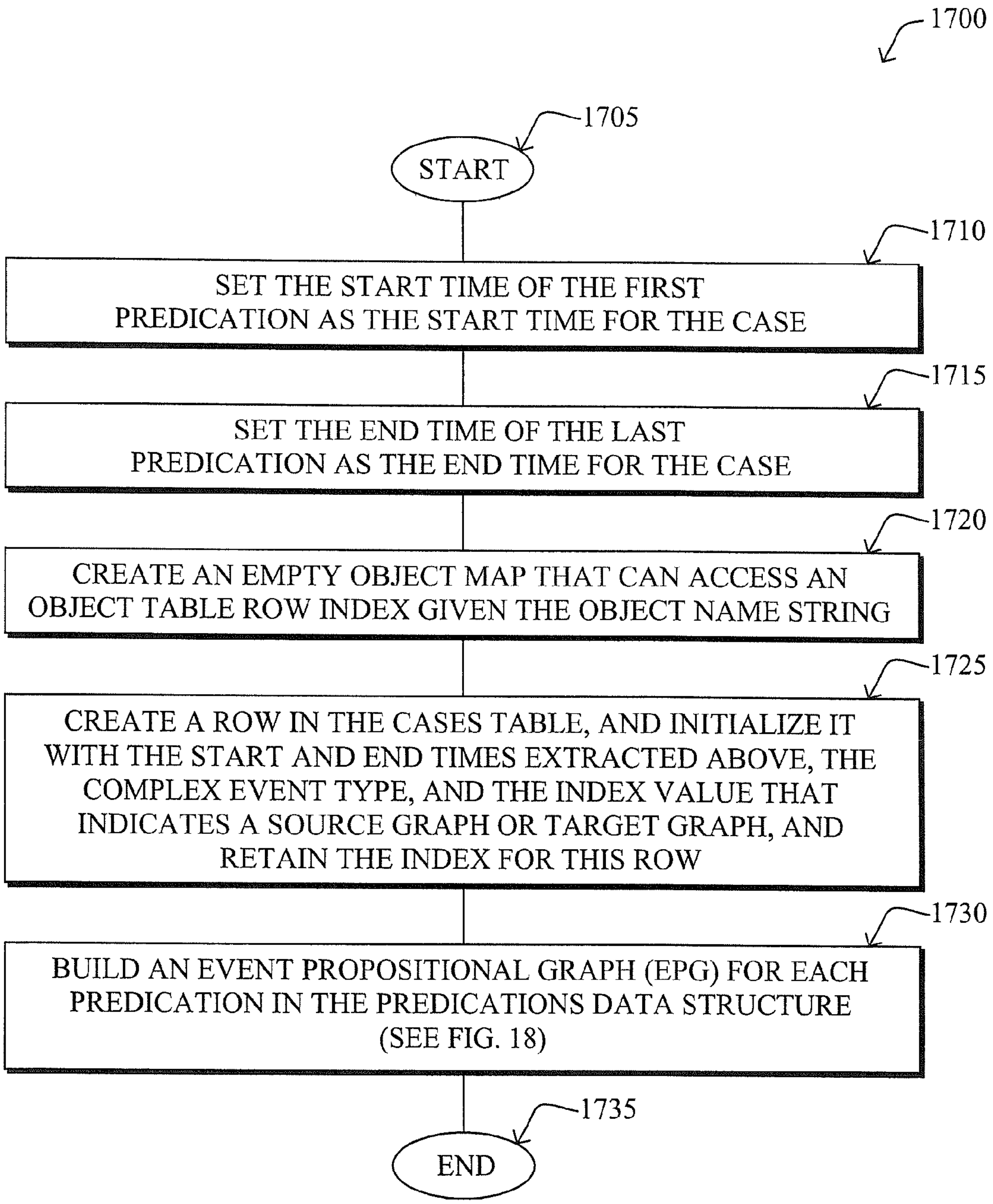

Turning now to FIG. 17, the procedure 1700 to write the predications for each Complex Event (as propositional graphs, described below) starts in step 1705, and continues to steps 1710 and 1715 to set the start time of the first predication and the end time of the last predication as the start and end times for the case, respectively. In step 1720 the system creates an empty Object Map that can access an Object table row index given the object name string. Also, in step 1725, the system creates a row in the Cases table, and initializes it with the start and end times extracted above, the Complex Event type (the type for source cases, unknown (e.g., −1) for target cases), and the index value that indicates a source graph or target graph, and retains the index for this row. From here, the system can build an Event Propositional Graph (EPG) for each predication in the predications data structure in step 1730, particularly according to procedure 1800 of FIG. 18 below, and the procedure 1700 ends in step 1735.

Figure 18:
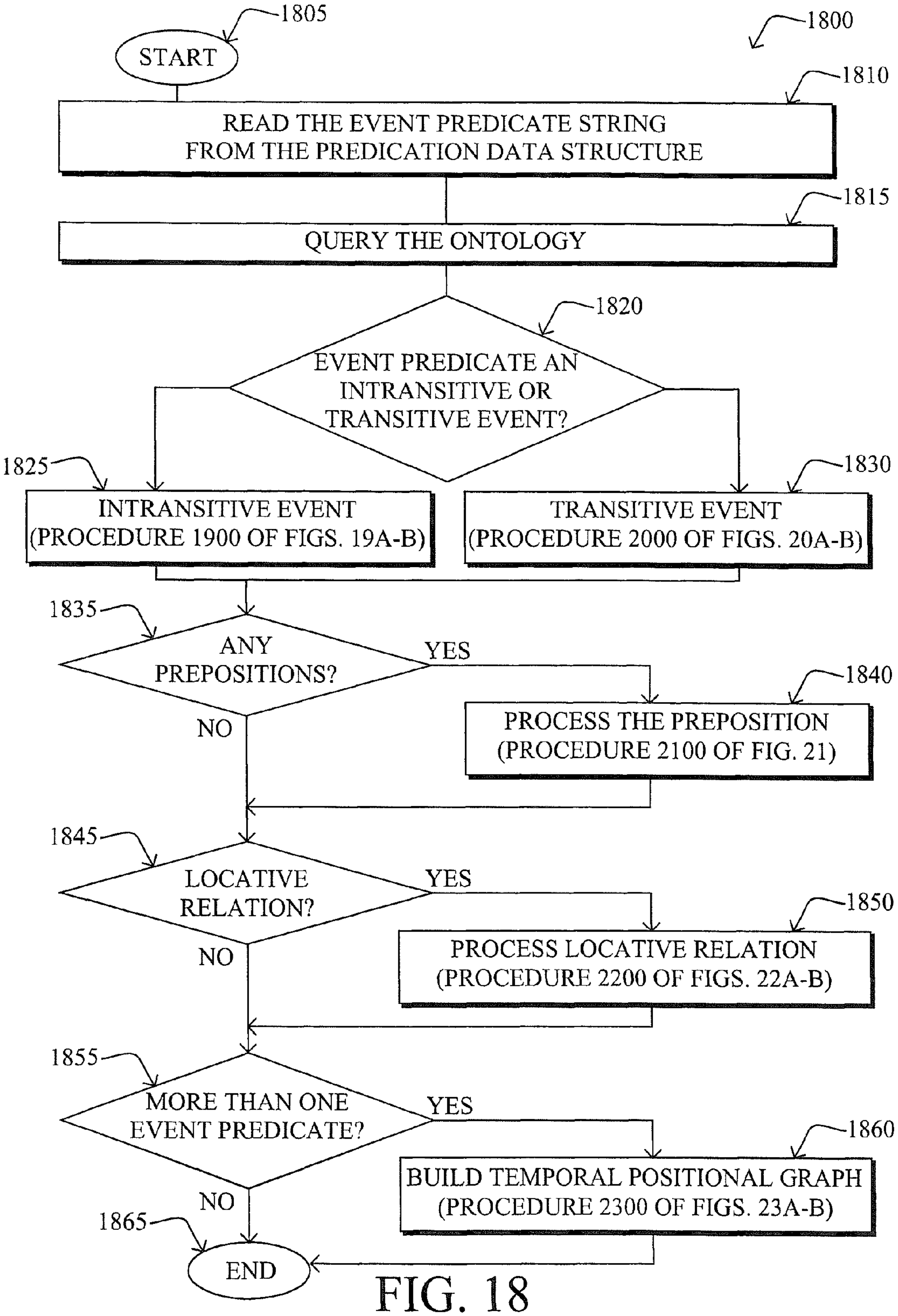
Figure 19A:
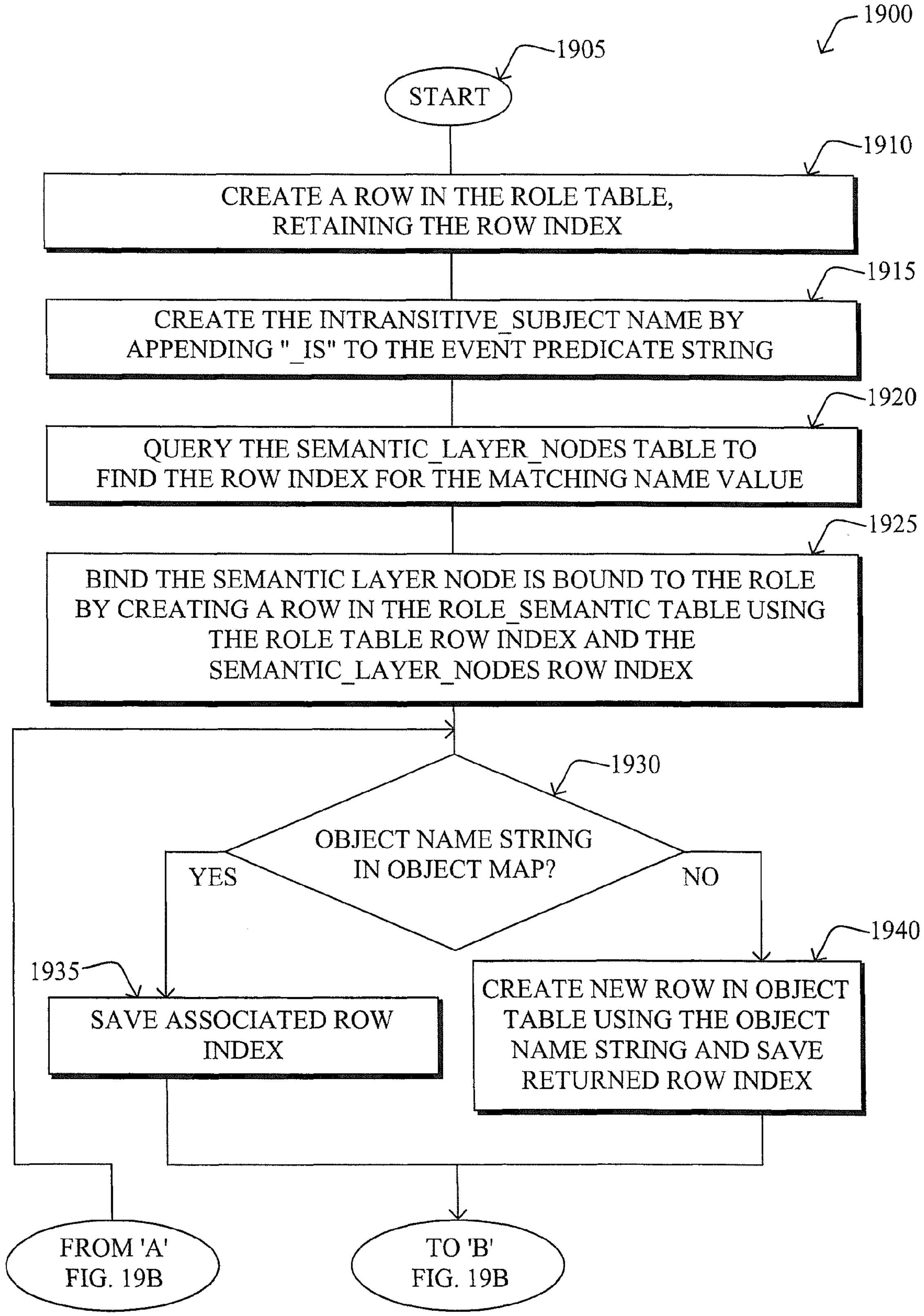
Figure 19B:
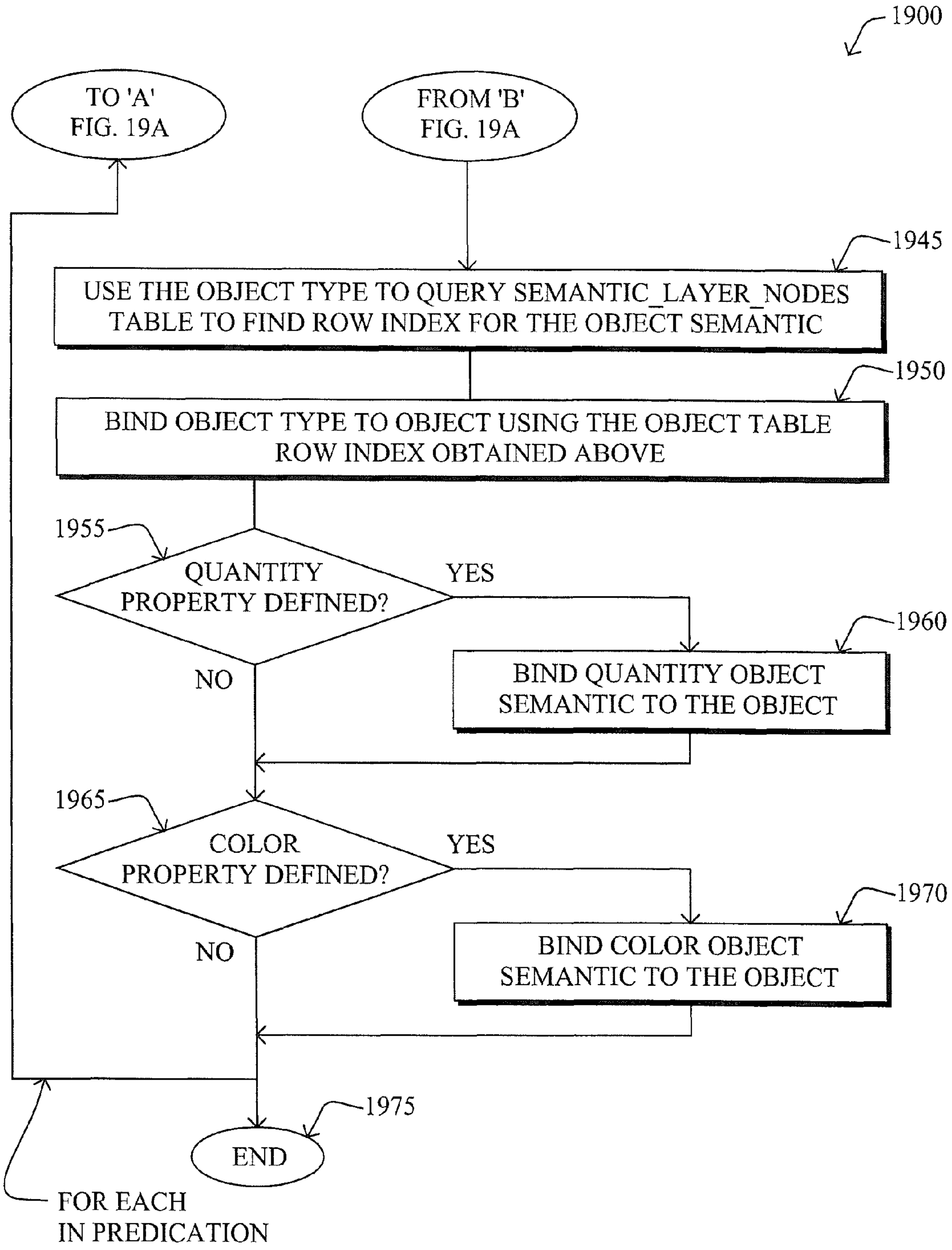
Figure 20A:
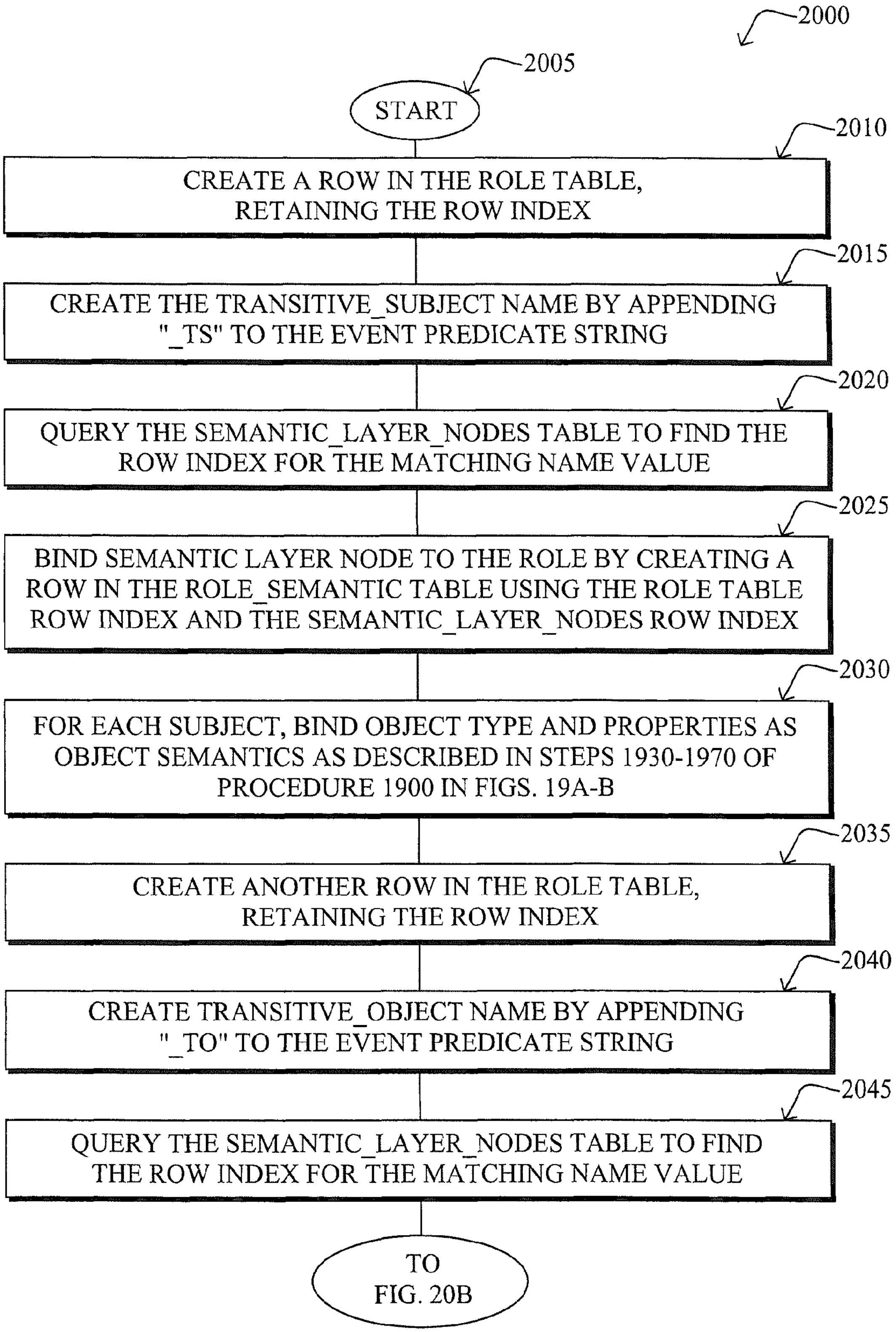
Figure 20B:
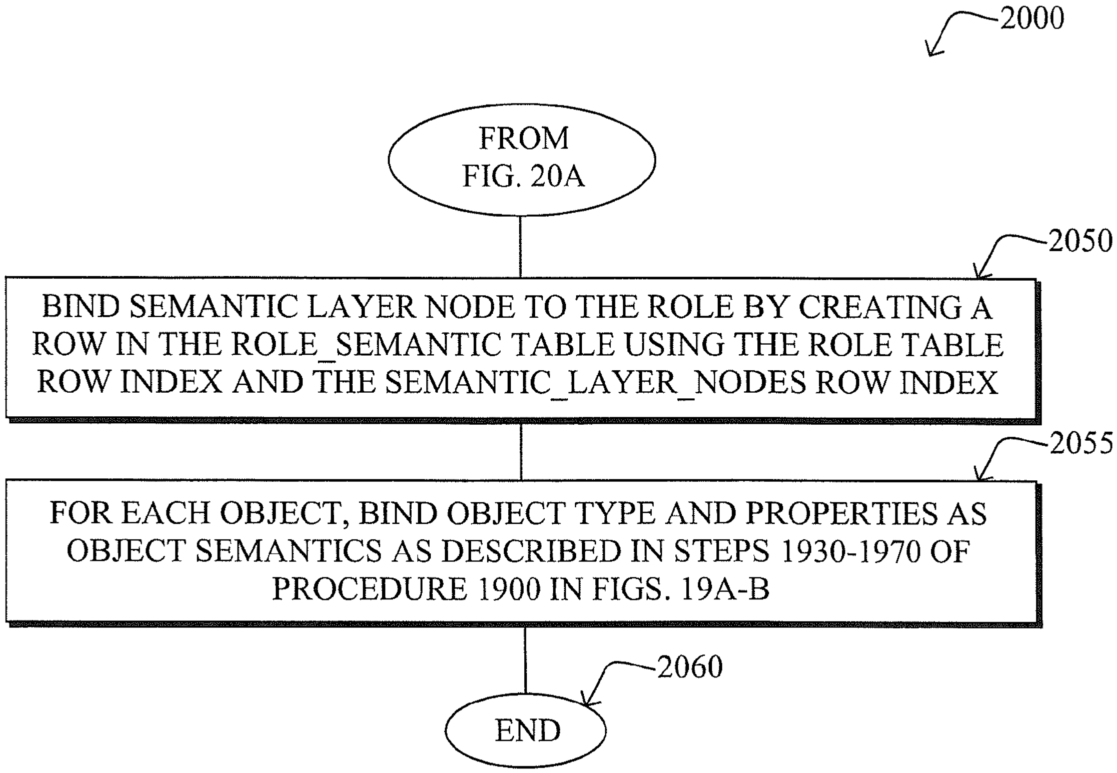

As noted, FIG. 18 details a procedure 1800 for building EPGs (and LPGs and TPGs) according to one or more embodiments herein (thus storing a propositional graph in a database), with particular details outlined in procedures 1900-2300 of FIGS. 19A-23B, where noted. The procedure 1800 starts in step 1805, and continues to step 1810 to read the event predicate string from the predication data structure. Subsequently, in step 1815, the system queries the ontology (recall that the annotation tool used to create the metadata uses an identical set of event predicate strings) to determine in step 1820 if this event predicate is a subclass of IntransitiveEvent or TransitiveEvent (i.e., determining whether a particular event of the predication is a transitive predicate or an intransitive predicate). If the event predicate is an Intransitive Event, then the procedure continues to step 1825 to proceed according to the details outlined below in procedure 1900 of FIGS. 19A-B for Intransitive Events (i.e., to create an intransitive subject role in response to intransitive predicates). Alternatively, if the event predicate is a Transitive Event, then the procedure continues to step 1830 to proceed according to the details outlined below in procedure 2000 of FIGS. 20A-B for Transitive Events (i.e., to create a logical subject role and logical object role in response to transitive predicates). Note that in each respective procedure (1900 and 2000), the corresponding associated objects may be bound to corresponding created roles for the particular event in the propositional graph, accordingly.

Once the event predicate is processed in either step 1825 or 1830, then the procedure 1800 continues to step 1835 to determine whether any Prepositions are defined in the string/predication. If so, then the procedure 1800 proceeds to step 1840 to process the Preposition, as detailed in procedure 2100 of FIG. 21, below. Also, in step 1845, if a Locative Relation is defined in the predication, then the procedure 1800 proceeds to step 1850 to process the Locative Relation (e.g., to build a Locative Propositional Graph), as detailed in procedure 2200 of FIGS. 22A-B, also described below. Finally, in step 1855, it is determined whether there is a temporal relation between more than one event predicate, and if so, then a Temporal Positional Graph is built in step 1860, as detailed by procedure 2300 of FIGS. 23A-B below. The procedure 1800 then ends in step 1865.

As mentioned above, FIGS. 19A-B illustrate example details for a procedure 1900 in the instance where the event predicate is a subclass of IntransitiveEvent, such that it correspondingly does not have a direct object. The procedure 1900 starts at step 1905, and continues to step 1910 to create a row in the Role table, retaining the row index. Then, in step 1915, the system creates the IntransitiveSubject name by appending "_IS" to the event predicate string, and queries the SemanticLayerNodes table to find the row index for the matching Name value in step 1920. In step 1925, the semantic layer node is bound to the role by creating a row in the RoleSemantic table using the Role table row index and the SemanticLayerNodes row index.

For each of the subjects listed in the predication, the object name string is used to obtain the Object table row index and the object type is bound to the properties as object semantics as follows: If in step 1930 the object name string is in the Object Map, then the associated row index is saved in 1935; otherwise, in step 1940, a new row is created in the Object table using the object name string, and the returned row index is saved. In step 1945 the system can use the object type to query the SemanticLayerNodes table to find the row index for the object semantic, and binds it to the object using the Object table row index obtained above in step 1950. If a quantity property value is defined in step 1955, then a quantity object semantic is bound to the object in step 1960 (in other words, if a particular Object is associated with a quantity attribute, then the process binds the quantity attribute to the particular Object in the propositional graph). Similarly, if a color property value is defined in step 1965, then in step 1970 the system binds a color object semantic to the object (in other words, if a particular Object is associated with a color attribute, then the process binds the color attribute to the particular Object in the propositional graph). The procedure 1900 ends in step 1975.

Conversely, and as also mentioned above, FIGS. 20A-B illustrate example details for a procedure 2000 in the instance where the event predicate is a subclass of TransitiveEvent, such that it does have a direct object. The procedure 2000 starts at step 2005, and continues to step 2010 to create a row in the Role table, retaining the row index. Then, in step 2015, the system creates the TransitiveSubject name by appending "_TS" to the event predicate string, and queries the SemanticLayerNodes table to find the row index for the matching Name value in step 2020. The system then binds the semantic layer node to the role in step 2025 by creating a row in the RoleSemantic table using the Role table row index and the SemanticLayerNodes row index. For each of the subjects listed in the predication, the system in step 2030 uses the object name string to get the Object table row index and binds the object type and properties as object semantics as described above with reference to steps 1930-1970 of procedure 1900 in FIGS. 19A-B.

Also, since in procedure 2000 there is a Transitive Object, in step 2035 the system creates another row in the Role table, retaining the row index, and in step 2040 creates the TransitiveObject name by appending "_TO" to the event predicate string, and queries the SemanticLayerNodes table to find the row index for the matching Name value in step 2045. In step 2050, the semantic layer node is bound to the role by creating a row in the RoleSemantic table using the Role table row index and the SemanticLayerNodes row index. For each of the objects listed in the predication, in step 2055 the system uses the object name string to get the Object table row index and binds the object type and properties as object semantics as described above, again with reference to steps 1930-1970 of procedure 1900 in FIGS. 19A-B. The procedure 2000 ends in step 2060.

Figure 21:
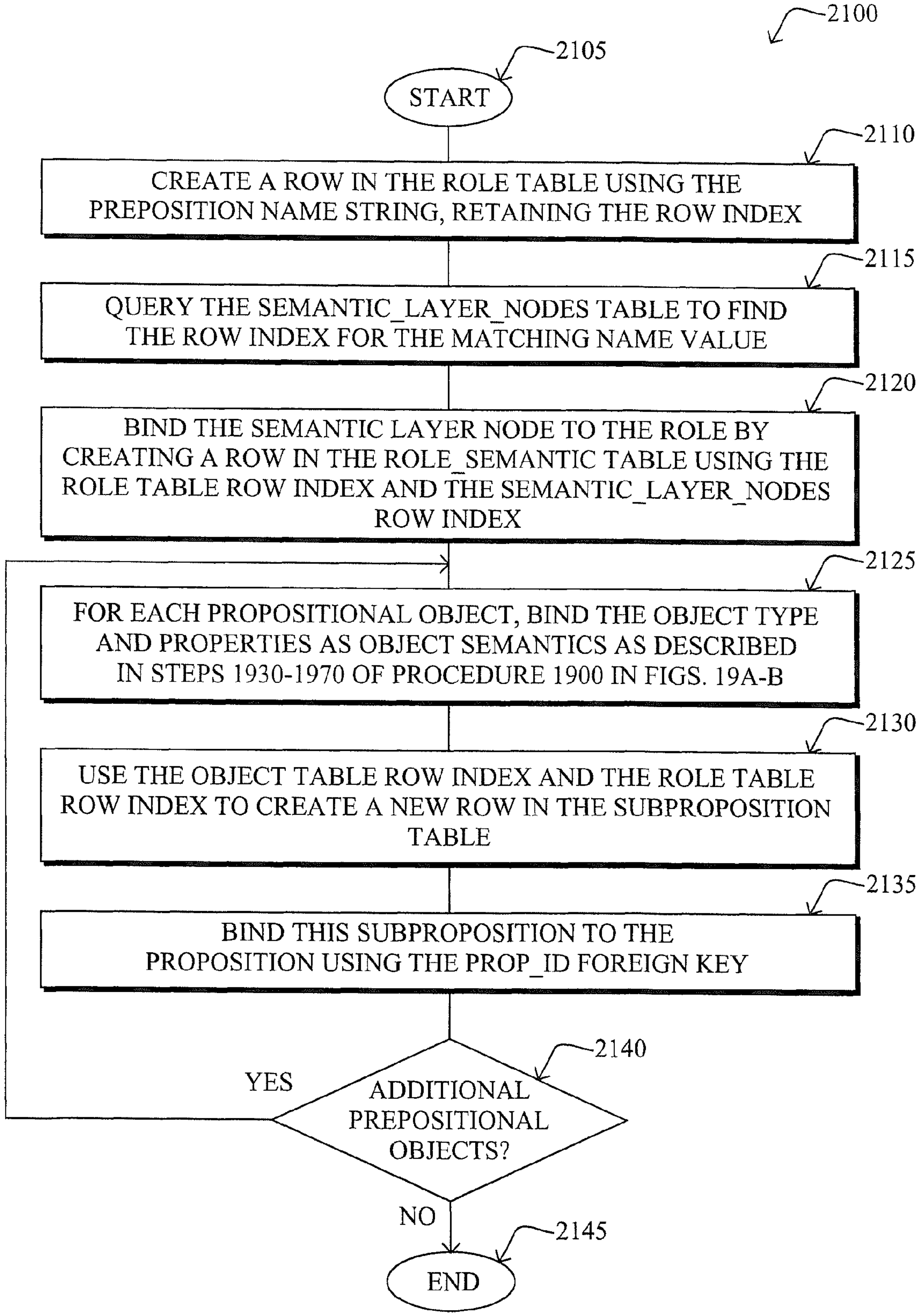

As shown in FIG. 21, procedure 2100 details the steps taken if a preposition is defined in step 1840 of FIG. 18 above to create a prepositional role and to bind a corresponding object of the preposition to the prepositional object role for the preposition in the propositional graph. Procedure 2100 starts at step 2105, and continues to step 2110 to create a row in the Role table using the preposition name string, retaining the row index. The system queries the SemanticLayerNodes table in step 2115 to find the row index for the matching Name value, and binds the semantic layer node to the role in step 2120 by creating a row in the RoleSemantic table using the Role table row index and the SemanticLayerNodes row index. For each of the propositional objects listed in the predication, the system creates a new row in the Proposition table in step 2125, and uses the object name string to get the Object table row index and binds the object type and properties as object semantics in step 2130 as described above (with reference to steps 1930-1970 of procedure 1900 in FIGS. 19A-B). Also, in step 2135, the system uses the Object table row index and the Role table row index to create a new row in the Subproposition table, and in step 2140 binds this Subproposition to the Proposition using the Prop_ID foreign key. In the event there are additional prepositional objects in the predication in step 2145, then the procedure 2100 returns to step 2125. Otherwise, the procedure ends in step 2150.

Figure 22A:
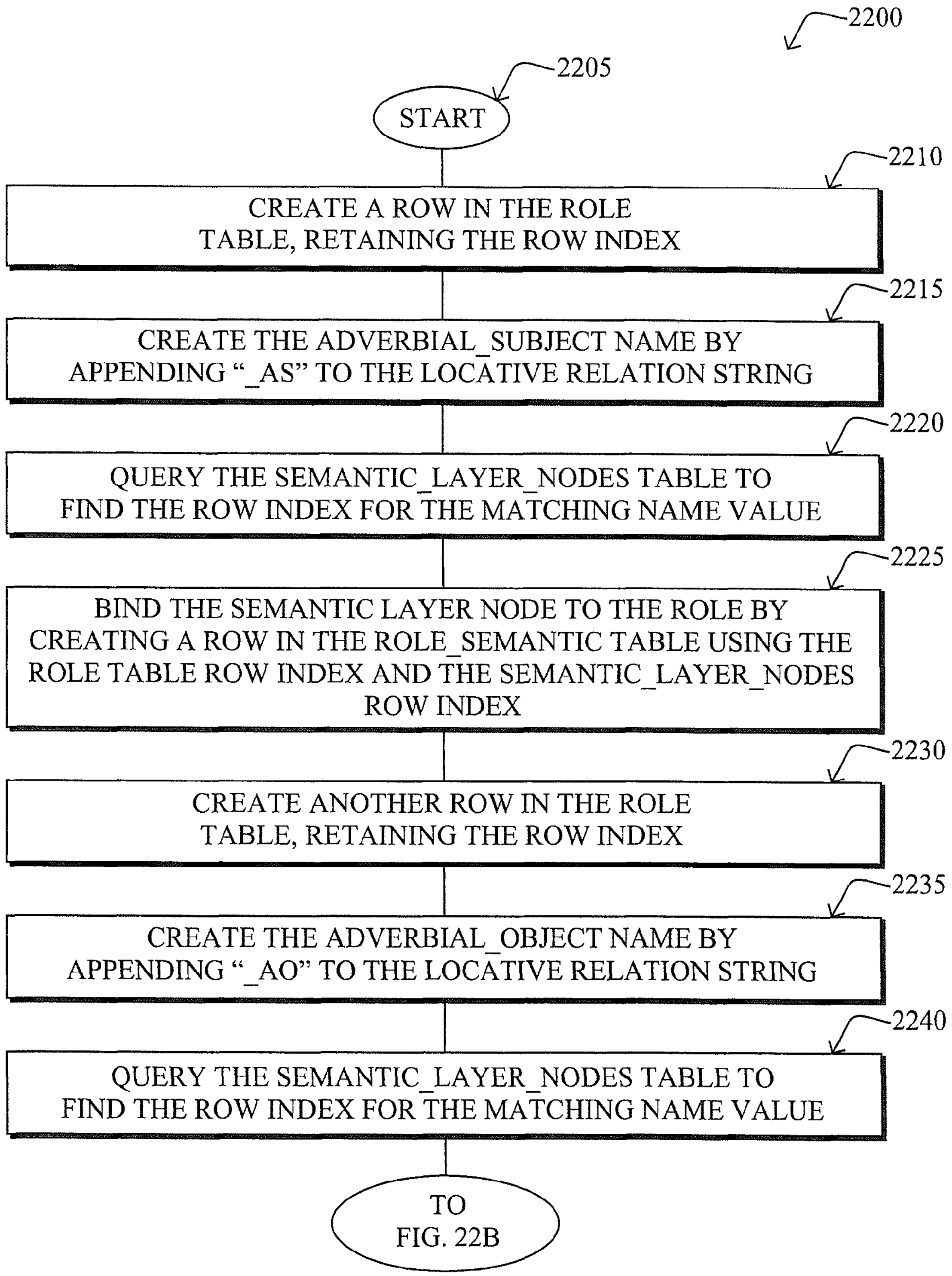
Figure 22B:
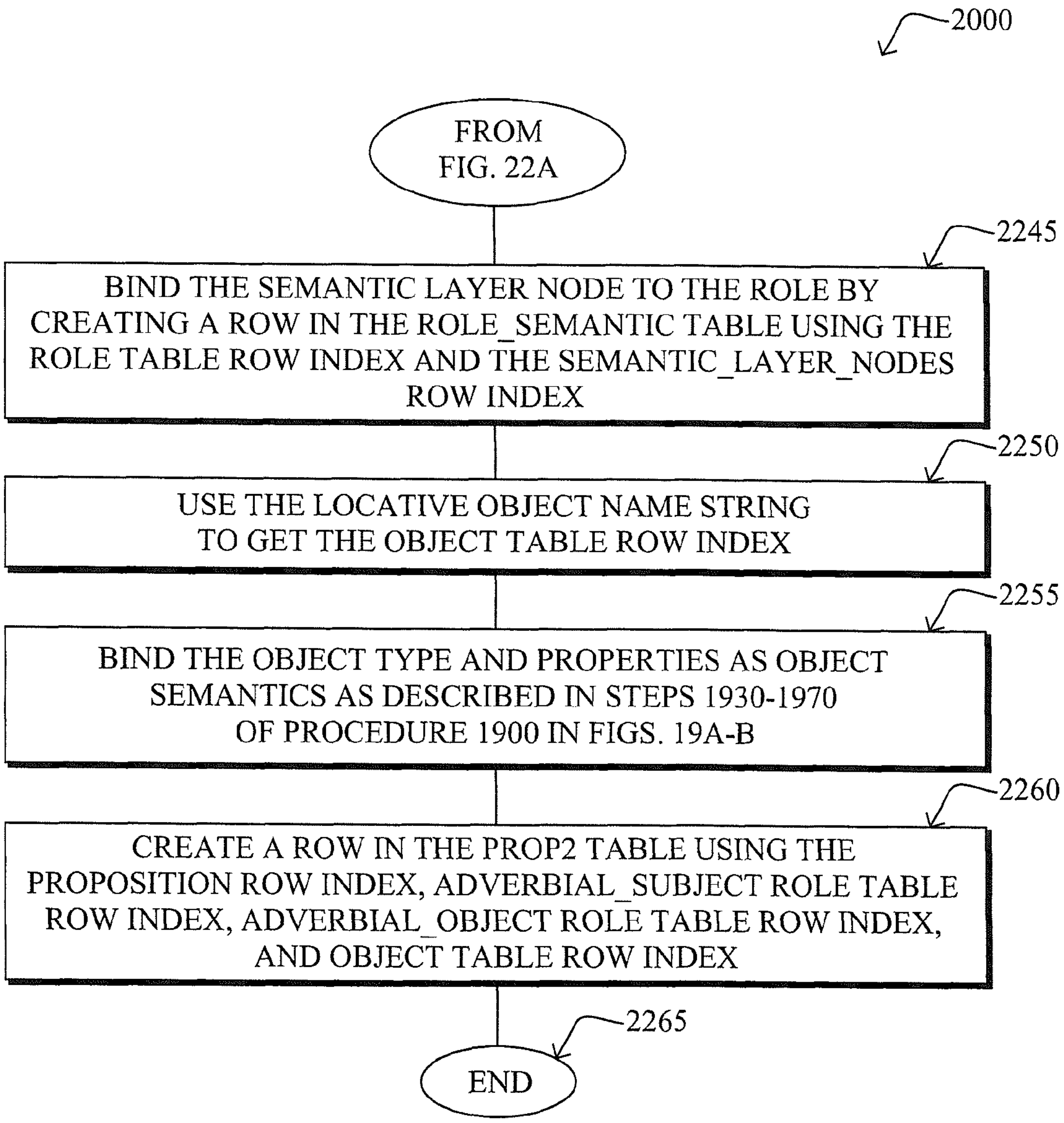

Furthermore, as shown in FIGS. 22A-B, procedure 2200 details the steps taken if a locative relation is defined in step 1850 of FIG. 18 above to create an adverbial subject role and an adverbial object role, and to bind a corresponding event of the locative relation to the adverbial subject role and a corresponding object of the locative relation to the adverbial object role in the propositional graph (e.g., in a separate, related locative propositional graph). Procedure 2200 starts at step 2205, and continues to step 2210 to create a row in the Role table, retaining the row index. The system creates the AdverbialSubject name in step 2215 by appending "_AS" to the locative relation string, and queries the SemanticLayerNodes table in step 2220 to find the row index for the matching Name value. In step 2225, the system then binds the semantic layer node to the role by creating a row in the RoleSemantic table using the Role table row index and the SemanticLayerNodes row index. Another row is created in the Role table in step 2230, retaining the row index, and the system creates the AdverbialObject name by appending "_AO" to the locative relation string in step 2235, and queries the SemanticLayerNodes table to find the row index for the matching Name value in step 2240. In step 2245, the semantic layer node is bound to the role by creating a row in the RoleSemantic table using the Role table row index and the SemanticLayerNodes row index. Then, in step 2250, the system uses the locative object name string to get the Object table row index, and in step 2255 binds the object type and properties as object semantics as described above with reference to steps 1930-1970 of procedure 1900 in FIGS. 19A-B. Subsequently, in step 2260, a row is created in the Prop2 table using the Proposition row index, AdverbialSubject Role table row index, AdverbialObject Role table row index, and Object table row index. The procedure 2200 ends in step 2265.

Figure 23A:
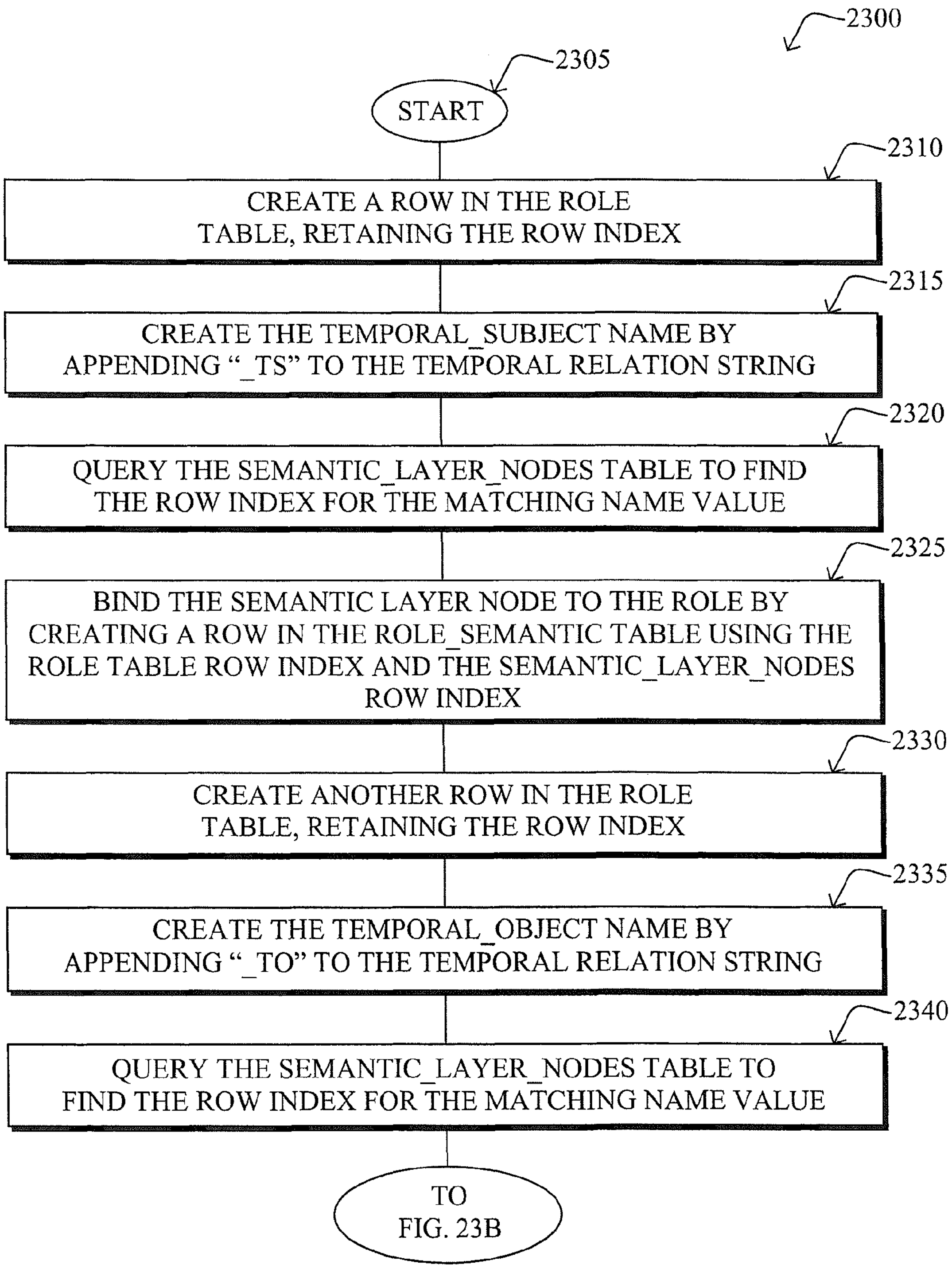
Figure 23B:
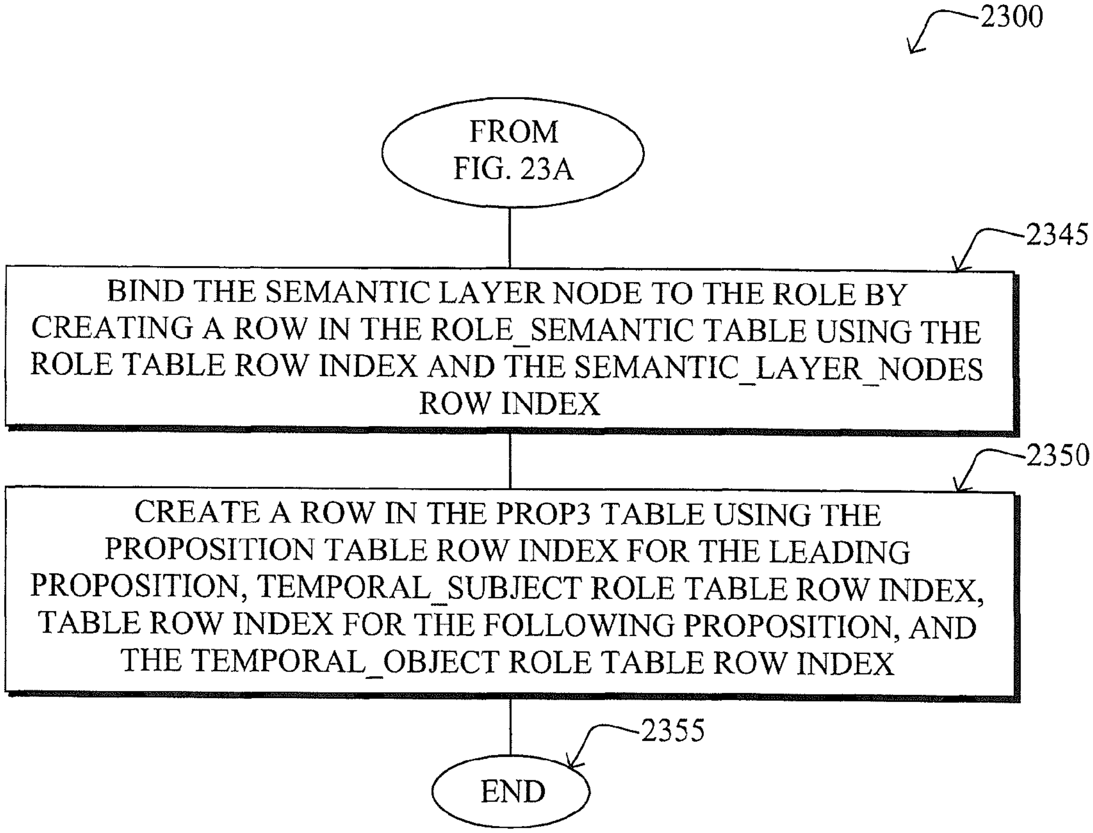
Figure 24A:
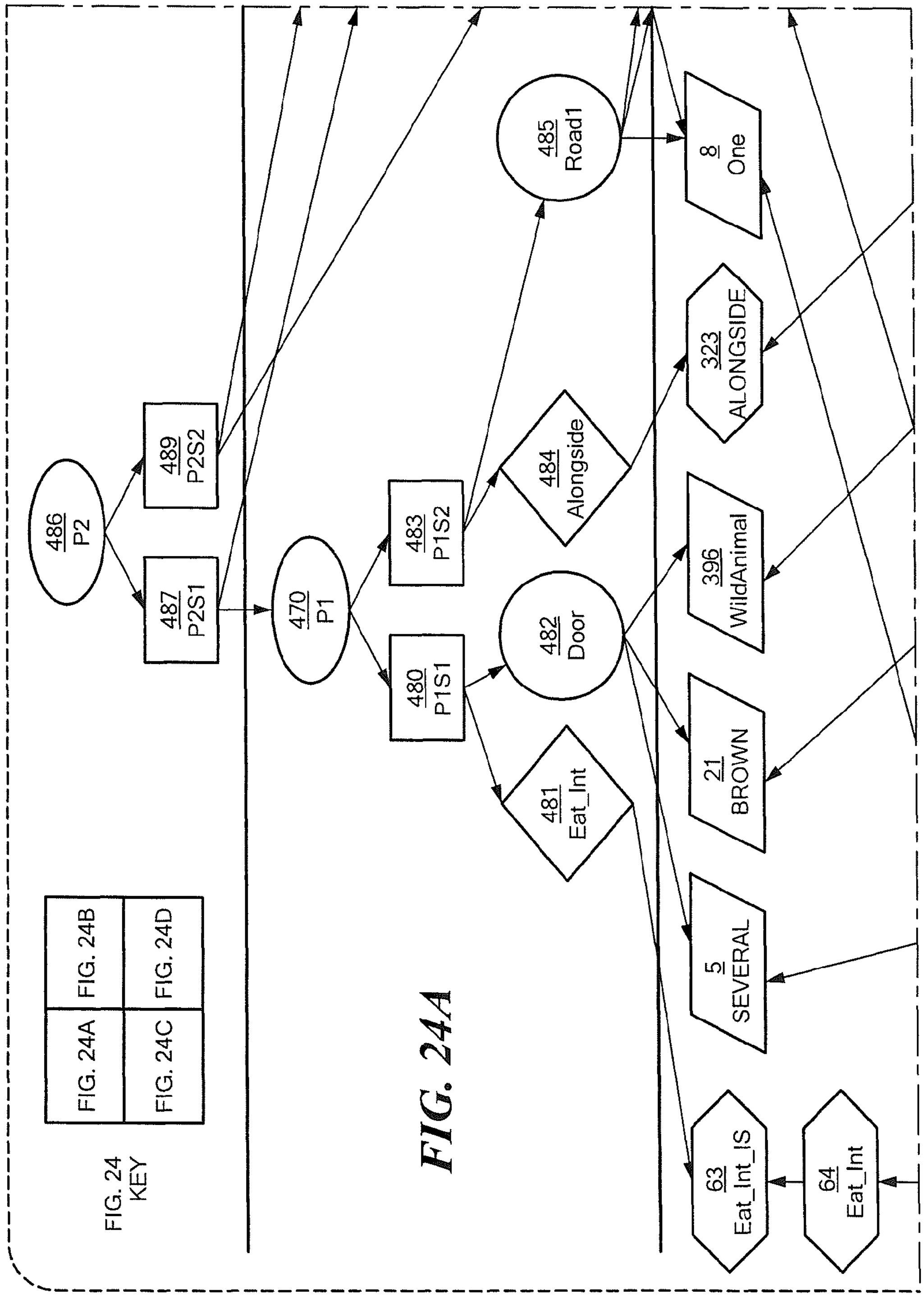
FIGS. 24A-24D illustrates a Propositions and Ontological Semantic Layer for the Predication: "Several brown deer eat alongside Road 1, above Parking Lot 1"
Figure 24B:
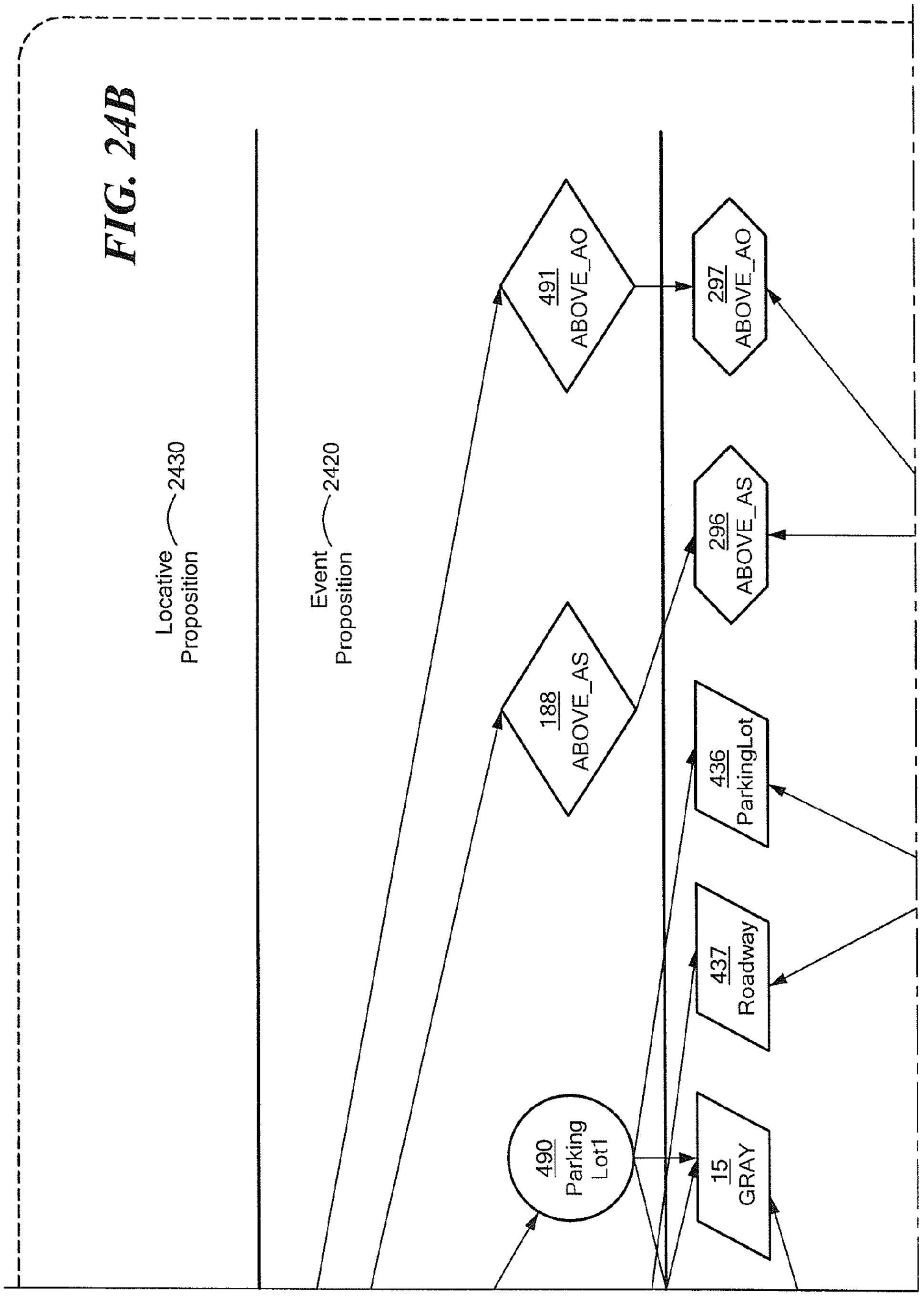
Figure 24C:
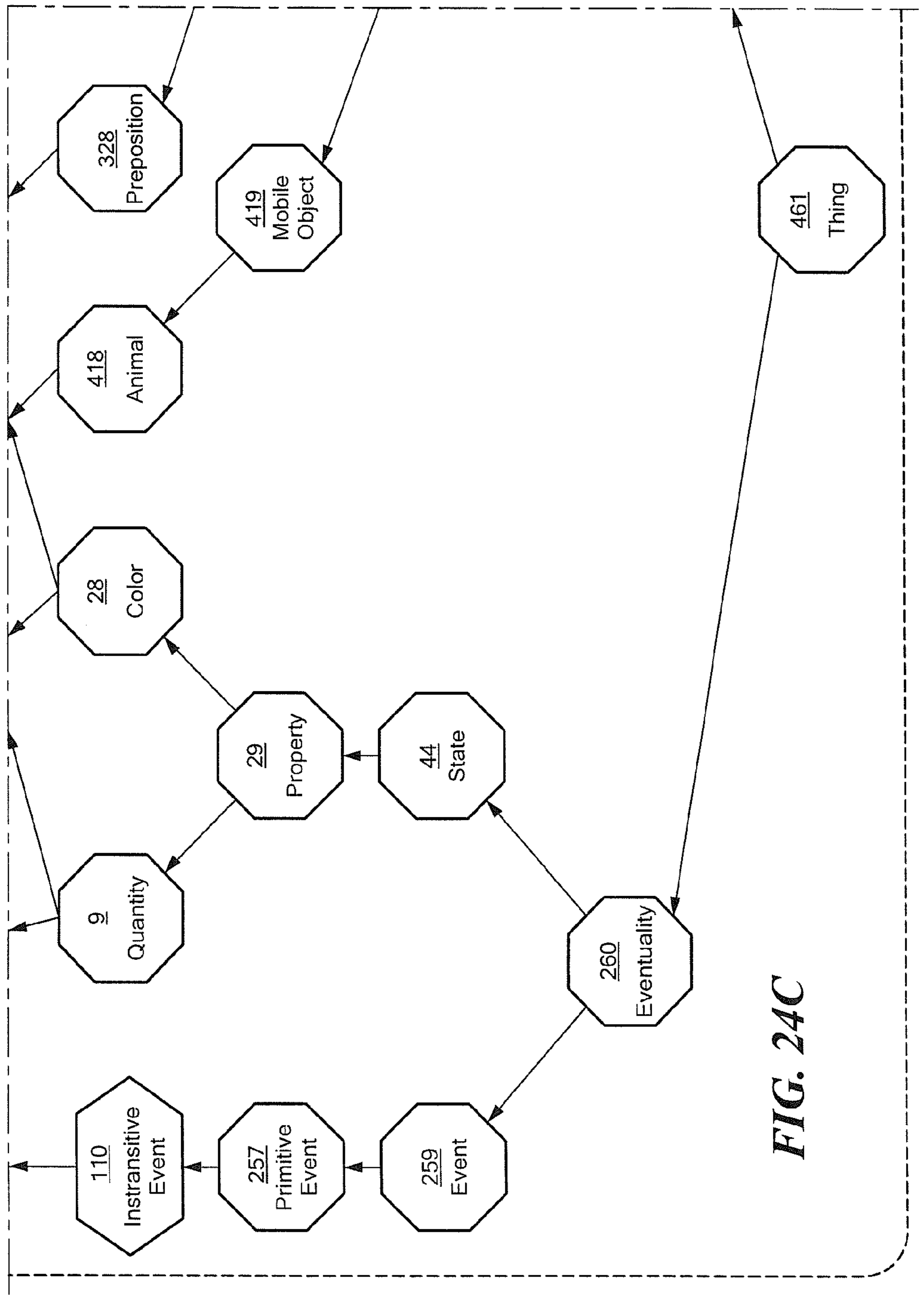
Figure 24D:
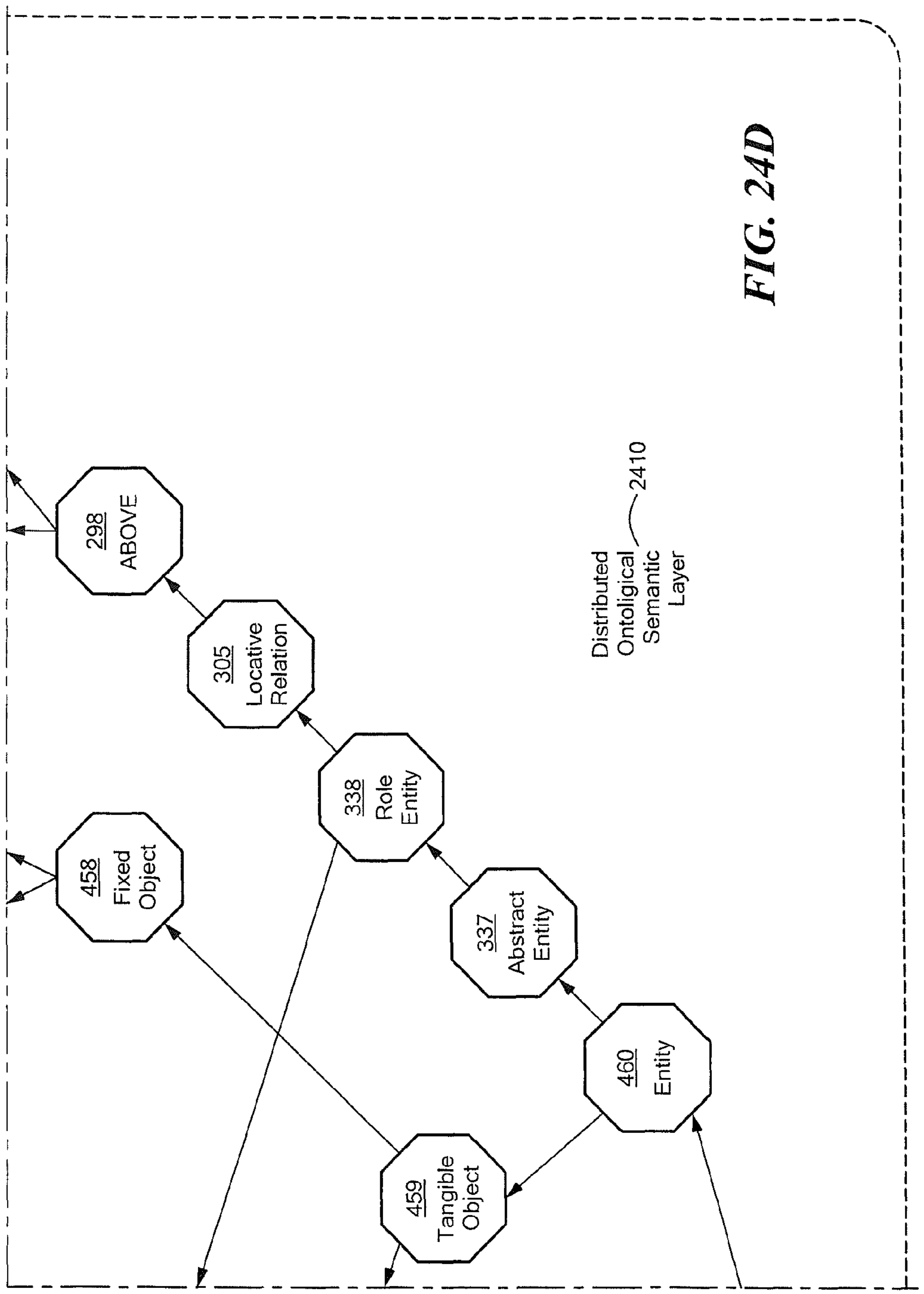

Finally, as shown in FIGS. 23A-B, procedure 2300 details the steps taken if there is a temporal relation between a pair or event predicates in step 1860 of FIG. 18 above, particularly the steps to build a Temporal Propositional Graph using the Prop3 table as follows to create a temporal object role and a temporal subject role in a temporal propositional graph, and to bind a first event predication of the pair to the temporal object role and a corresponding second event predication of the pair to the temporal subject role in the temporal propositional graph. Procedure 2300 starts at step 2305, and continues to step 2310 to create a row in the Role table, retaining the row index. In step 2315, the system creates the TemporalSubject name by appending "_TS" to the temporal relation string, and queries the SemanticLayerNodes table in step 2320 to find the row index for the matching Name value. In step 2325, then, the semantic layer node is bound to the role by creating a row in the RoleSemantic table using the Role table row index and the SemanticLayerNodes row index. Another row is then created in the Role table, retaining the row index, in step 2330, and the system creates the TemporalObject name by appending "_TO" to the temporal relation string in step 2335. Also, the system queries the SemanticLayerNodes table to find the row index for the matching Name value in step 2340. In step 2345 the semantic layer node is bound to the role by creating a row in the RoleSemantic table using the Role table row index and the SemanticLayerNodes row index. Finally, in step 2350, a row is created in the Prop3 table using the Proposition table row index for the leading (in time) proposition, TemporalSubject Role table row index, table row index for the following proposition, and the TemporalObject Role table row index. The procedure 2300 ends in step 2355. Note that in general, temporal predicates may be formed from two or more event predications by comparing their start and end timer-tags. While certain temporal logic (e.g., "Allen's" temporal logic, as will be understood by those skilled in the art, and as noted below) may be particularly rigorous, a simple "is-before" relation may be used for the predications based on start and end times to simplify the system and yet maintain a degree of ordering between the event predicates.

Further System Considerations

The analogical reasoner nodes 350$a$-350$n$ may implement a parallel analogical reasoning system. In particular, in one embodiment, the semantic layer may be distributed across all of the processing nodes, that is, each analogical reasoner node has its own independent portion of the semantic layer. However, in a preferred embodiment herein, each node maintains an identical copy of the DOSL. This expends inexpensive memory space to save expensive communication bandwidth (i.e., there are fewer and simpler interprocessor communications). In the first noted embodiment, it may be assumed that a special-purpose subsystem routes parcels between processor nodes without those nodes needing to know where vertices are located. In the preferred embodiment herein, however, no such subsystem is assumed, and each processor node builds a map of the location of remote vertices.

Also, in certain embodiments above the semantic layer is flat (i.e., one layer of role and object semantic vertices) and arbitrary, such as shown in FIG. 11. In particular, for a flat semantic layer, in the first phase of activation spreading (graph correlation, as will be understood by those skilled in the art), an activation "band", identified by the VID of the source case subproposition vertex from which it originated, is spread down to the (flat) semantic layer. Activation in the semantic layer vertices is then spread up into the target case in subsequent activation spreading phases. Spreading of activation is, therefore, based on which source and target graphs touch the various vertices of the semantic layer.

In one or more additional embodiments of the invention, however, the DOSL may be hierarchical and ontological. For instance, as shown in FIGS. 24A-24D, showing Propositions (2420 and 2430) and an Ontological Semantic Layer 2410 for the Predication: "Several brown deer eat alongside Road 1, above Parking Lot 1", all activation flows up to the "Thing" vertex at the top of the DOSL graph (shown at the bottom of the figure, as leaves at the bottom of the DOSL graph are also the leaf nodes of the case graph). One advantage to this, as noted above, is that objects, events, attributes, or states that do not explicitly appear in the ontology (and therefore cannot be selected during annotation), can be represented by a superclass (or parent class), thus preserving some of the intended meaning, as further described below (i.e., there is a graceful reduction of information if the metadata must indicate a superclass instead of the exact semantic). In other words, the ontological semantic layer may be organized as a hierarchical ontological semantic layer such that elements not within the hierarchical ontological semantic layer have the ability to be represented by a corresponding superclass within the hierarchical ontological semantic layer.

Note that each vertex in FIGS. 24A-24D contains an illustrative number. This is a notional representation of the VIDs on a node from an actual run of the system. These VIDs "name" the band for the activation that originates from each vertex in the named association sparse activation vector. This named association approach for creating a sparse activation vector helps to solve a correlation matrix size explosion that may happen when processing large graphs That is, certain propositional graphs may become very wide, but are typically less than 15 vertices tall (see, for example, FIGS. 25A-25C and FIGS. 26A-26D below).

In the DOSL embodiment, the system uses a path signature, constructed by adding unity magnitude activation bands from each vertex visited in the DOSL (except for "Thing", which would appear in every vector), to the activation vector. Since the activation vector is a sparse representation, this adds a small number (typically <10) additional entries to the activation vector, and is thus an efficient way to identify these paths. For example, referring again to FIGS. 24A-24D, the DOSL subvector for role semantic "ABOVE_AO" is ((297, 1), (298, 1), (305, 1), (336, 1), (337, 1), (460, 1)), for role semantic "ALONGSIDE" is ((323, 1), (328, 1), (336, 1), (337, 1), (460, 1)), and for object semantic "BROWN" is ((21, 1), (28, 1), (29, 1), (44, 1), (260, 1)).

Similar to Fox07, Correlation between paths then simply becomes an inner product between the semantic layer subvectors. So, the correlation between ABOVE_AO and ALONGSIDE from FIGS. 24A-24D is 3, and between ABOVE_AO and BROWN is 0. This is expected, because BROWN is an object semantic and ABOVE_AO is a role semantic.

Communication between processor nodes then simply becomes an all-to-all exchange of the vectors collected at the "Thing" vertex. This is performed once per activation subphase.

The concepts, systems and techniques described herein can also have the following different methods of operation:

1. Automatic proposition extractor 320 can be extended to detect multithread events, as defined in Bolles04.
2. Automatic proposition extractor 320 can be extended to detect single- and multithread events from multiple FOVs. This would be done by projecting the views onto a common 3D space that represents the intersection of the various viewing frustums, and reasoning about the correspondences between objects in the separate FOVs.
3. Automatic proposition extractor 320 can be extended to handle changes in the FOV, such as movement of the line-of-sight (LOS) and changes in the camera parameters (such as zoom).

4. Automatic proposition extractor 320 can be extended to use preliminary detection methods, such as a hidden Markov model (HMM), to perform a preliminary detection and ranking before submitting the case to the analogical reasoner.
5. Automatic proposition extractor 320 can be extended to leverage the "causes" and "is-followed-by" event-to-event links to provide evidence for the association of events and objects in multiple FOVs.
6. Automatic proposition extractor 320 can be extended to support more advanced temporal reasoning, such as Allen's interval temporal logic, (Allen, J. F., G. Ferguson (1994)—*Actions and Events in Interval Temporal Logic*, Technical Report 521, Computer Science Department, University of Rochester) on the start/end times for the events to better handle overlapping and containing time intervals.
7. Analogical reasoner nodes 350 can be extended, as in Fox07, to infer missing components of a case. These could be presented to the user as alerts of scene components to watch for. If run in real-time, this capability could be part of the post processing for the video annotation.
8. Analogical reasoner nodes 350 can be extended, as described in Fox07, to perform schema induction that produces a new generalization for classes of cases.
9. Web server 370 can be outside of the system, as long as the data described above are resident on the server and accessible by the components of the behavior detection system 100.
10. Cloud server 397 could be replaced by any other publication/subscription (pub/sub) service, such as a Data Distribution Service (DDS) (e.g., the *Data Distribution Service for Real-time Systems*, v1.2, available from the Object Management Group, Inc.).

Moreover, the concepts, systems and techniques described herein can occur in each of the following forms:

1. The syndication client 310, automatic proposition extractor 320, data center server 330, web server 370, ontological semantic layer builder 360, and all analogical reasoner nodes 350 could all run on the same computer hardware (such as the system 100 shown in FIG. 1). In this case, the internal network 340 would be localhost, or equivalent.
2. The syndication client 310, automatic proposition extractor 320, data center server 330, web server 370, ontological semantic layer builder 360, and each analogical reasoner node 350 could each run on one or more different processor nodes of a parallel supercomputer. In this case, internal network 340 would be a high-speed (possibly shared memory) backplane, such as an Interconnect Fabric.
3. The syndication client 310, automatic proposition extractor 320, data center server 330, web server 370, ontological semantic layer builder 360, and each analogical reasoner node 350 could each run on one or more different processor nodes in a plurality of system-on-a-chip devices, which provide embedded processor blocks and memory or a processor and memory. In this case, the internal block RAM, FPGA fabric, fast on-chip interfaces, and fast off-chip interfaces could be used to implement internal network 340.
4. The syndication client 310, automatic proposition extractor 320, data center server 330, web server 370, ontological semantic layer builder 360, and each analogical reasoner node 350 could run separately or in groups on laptop computers, desktop computers, or the nodes of a Windows or Linux cluster. In this case, internal network 340 would be some version of Ethernet, augmented by a communication fabric such as the known Message Passing Interface (MPI).

Closing Remarks

A system and method has been described herein for detecting the presence of specific kinds of behavior expressed in semantic metadata by analogy with similar behaviors has been described in accordance with the present invention. The analogy is determined computationally using an Analogical Reasoning System (ARS). Generation of semantic metadata (by human or machine annotators), conversion of the metadata to a form suitable for analogical reasoning, and the actual analogical reasoning processing are all based on a common ontological model of behaviors. Conversion of the metadata to a form suitable for analogical reasoning is automatic.

The multi-phase, multi-year ARDA/DTO/IARPA Video Analysis Content Extraction (VACE) program shows that there is an extremely high degree of interest by the Intelligence Community in systems with the capability to automatically detect, retrieve, and index objects and semantic events in video. The VACE architecture divides these problems into one of extracting metadata from video and one of extracting higher-order knowledge from the metadata. The concepts, systems and techniques described herein can be used to find analogous situations in video by analogy of the metadata for that video with previously seen and classified situation cases.

With this particular arrangement, a system for automatically detecting certain behaviors, e.g., threat behaviors, in surveillance video is provided. Such detection is accomplished by pairing the system with an external system that can input surveillance video and output metadata that describes the objects and events in the video. Note that the concepts, systems and techniques described herein also has the following uses:

1. Detecting behavior in other types of video metadata, such as newscast, documentary films.
2. Detecting rule infractions and performance-related behavior in sports broadcasts and game films.
3. Detecting unsafe work practice behaviors in industrial surveillance video metadata.

Figure 25A:
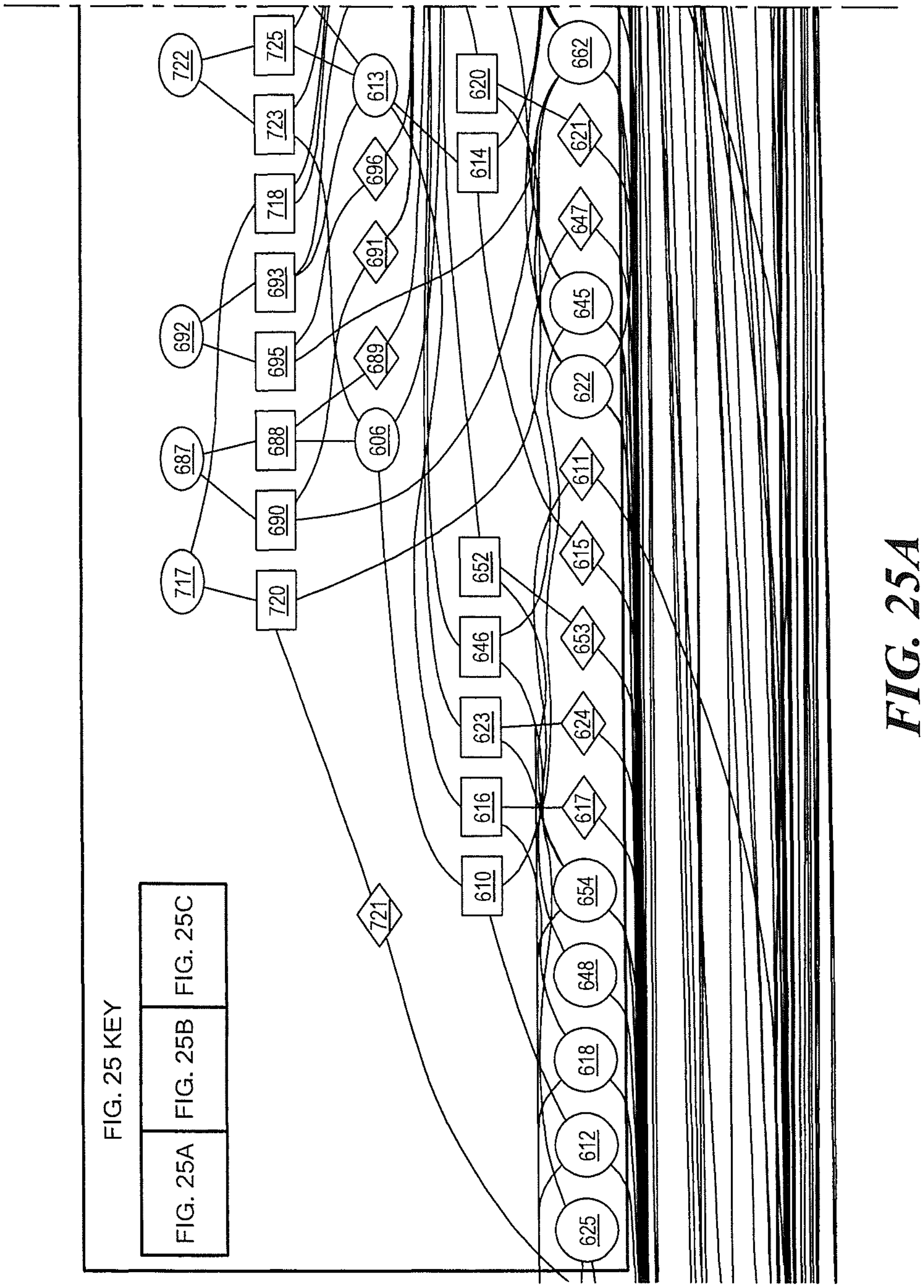
FIGS. 25A-25C and 26A-26D illustrate example renderings of a propositional graph for a scenario as read from memory.
Figure 25B:
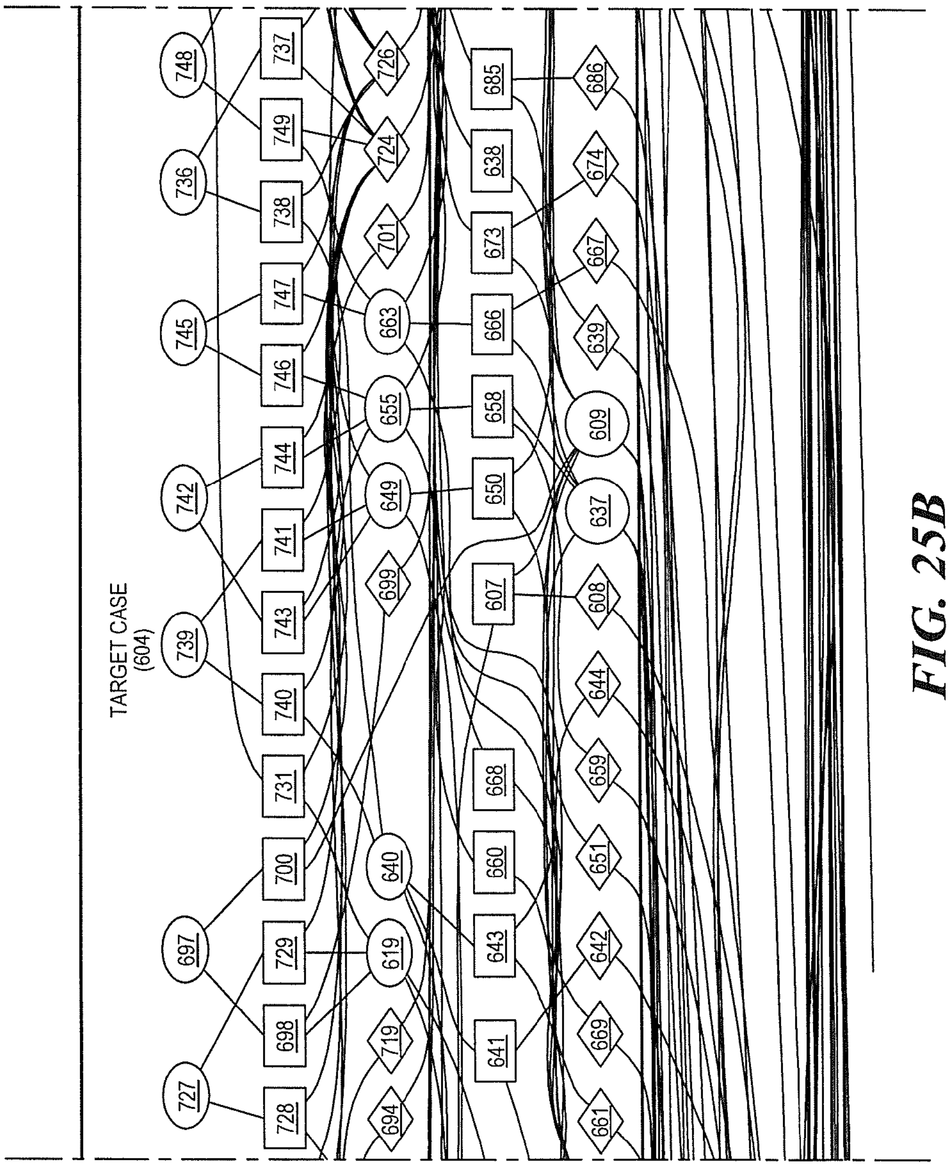
Figure 25C:
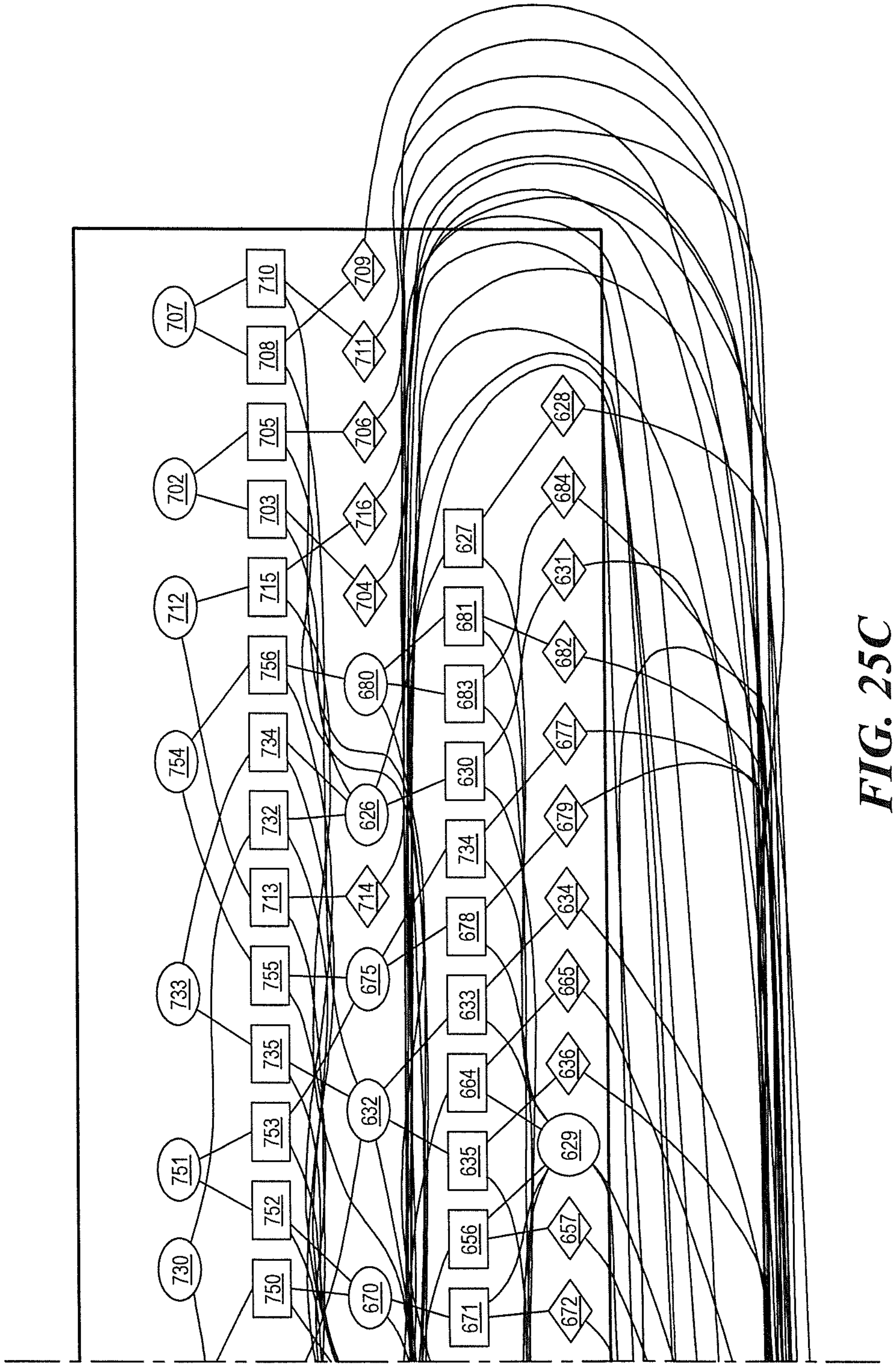
Figure 26A:
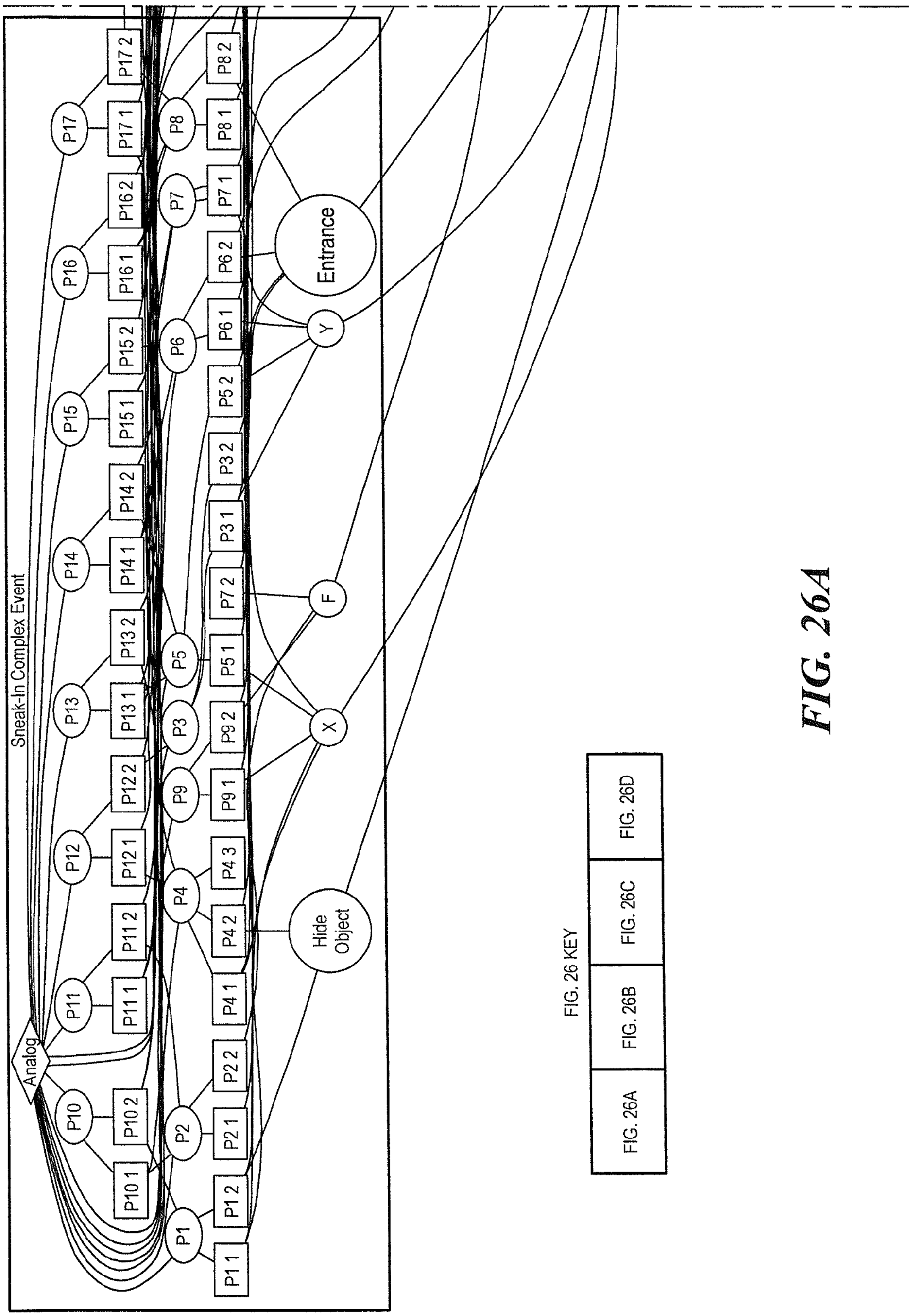
Figure 26B:
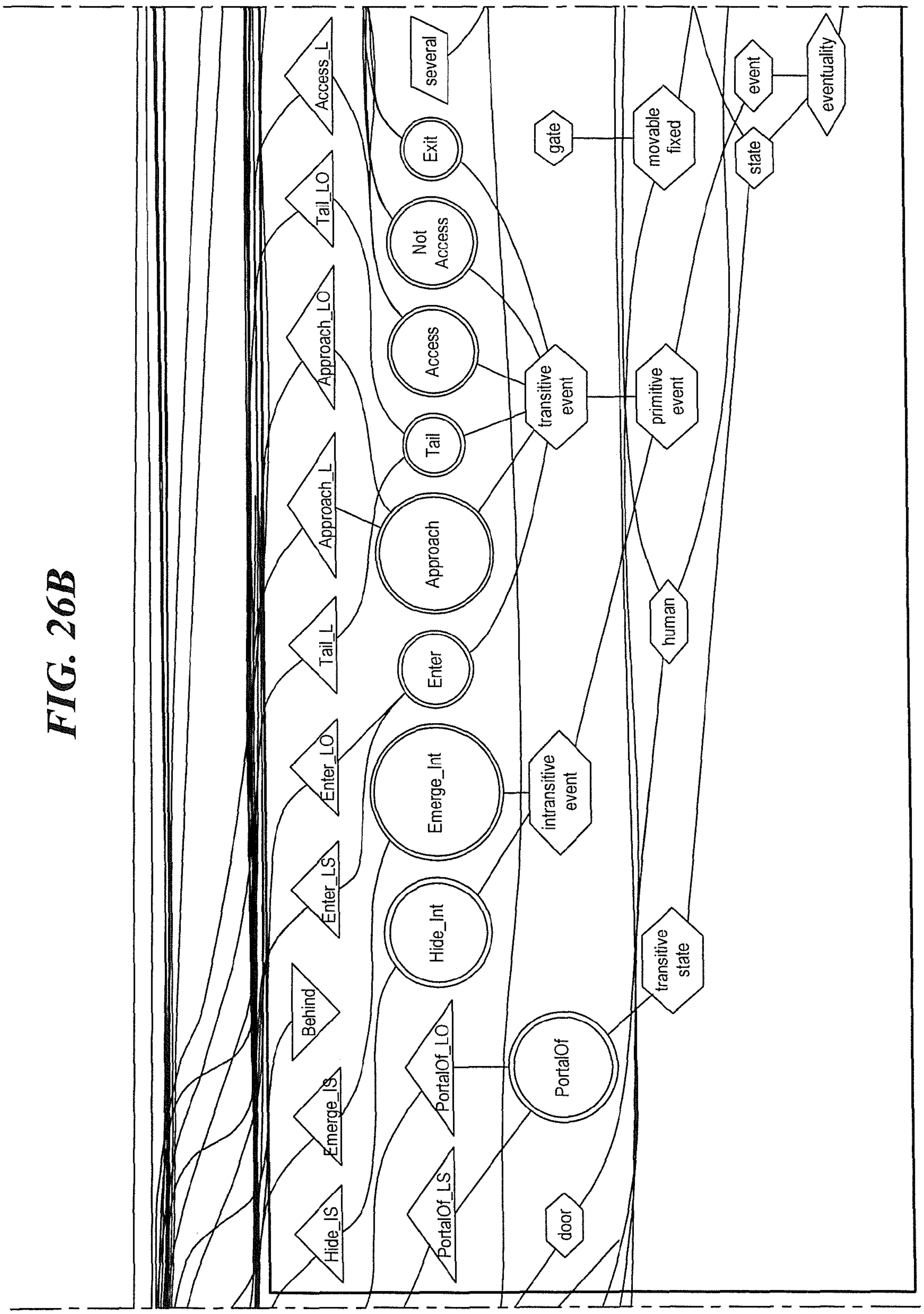
Figure 26C:
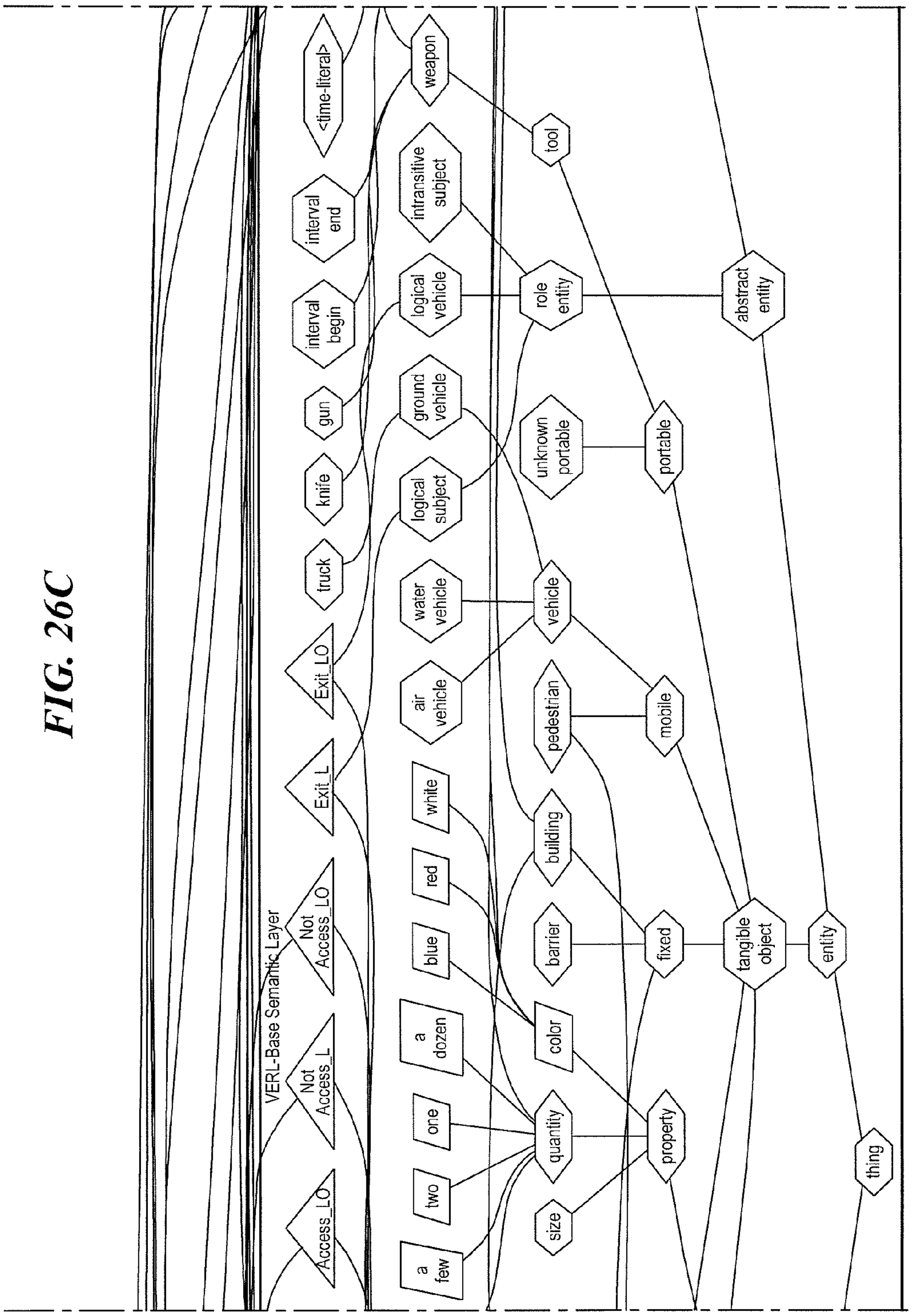
Figure 26D:
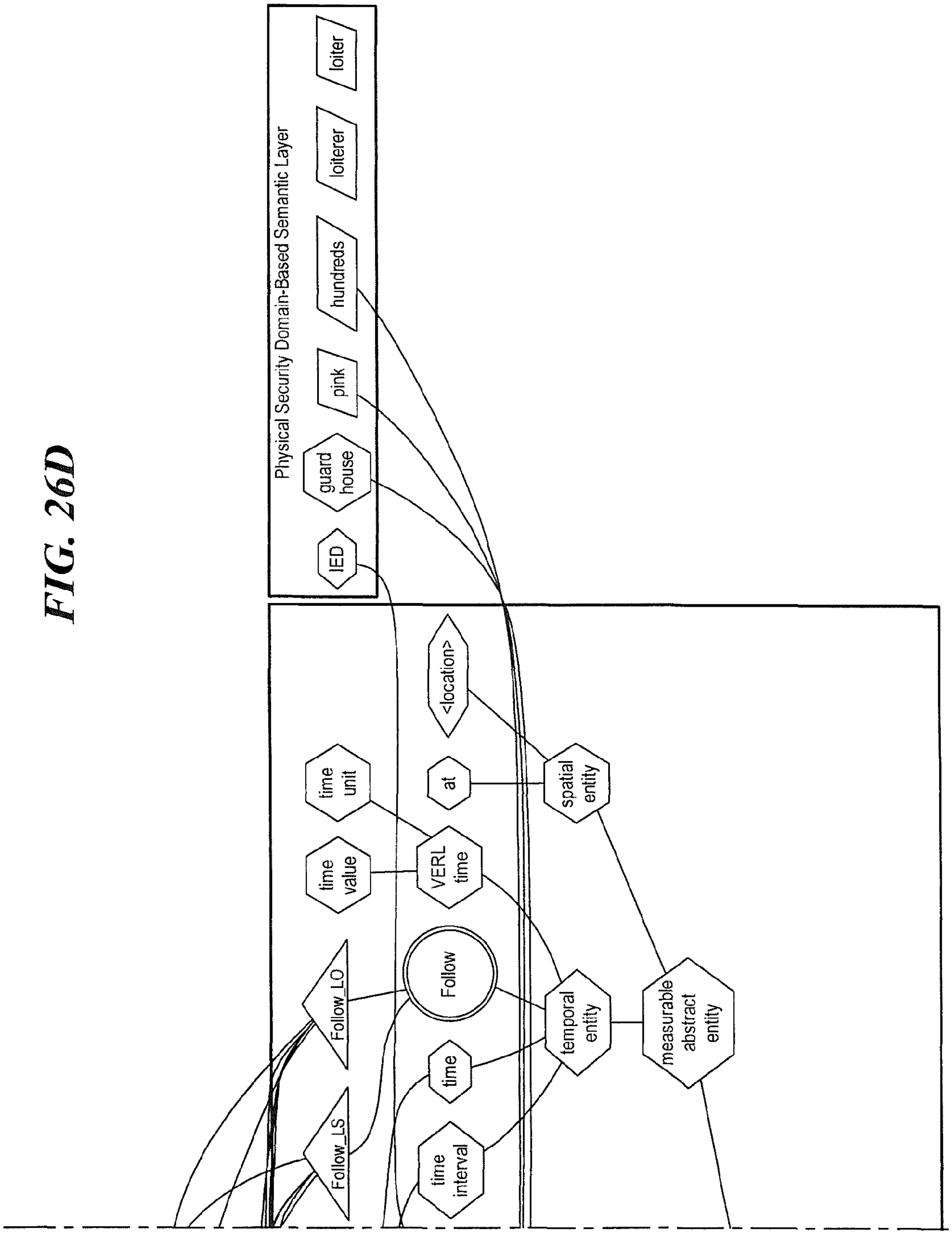

Furthermore, construction of the propositional graphs used in an ARS is extremely labor-intensive. One advantage of the system and techniques described herein over prior art systems and techniques is the automatic extraction of propositional graphs from video metadata structured by the method described by this invention. For example, FIGS. 25A-25C shows a rendering of a portion of a propositional graph for a scenario as read from memory. The arcs exiting the left of FIGS. 25A-25C are edges connecting to vertices of the ontological semantic layer. FIGS. 26A-26D shows a rendering of a portion of a propositional graph with a portion of an ontological semantic layer. Clearly, construction of such graphs is extremely labor-intensive.

Another advantage of the system and techniques described herein over prior art systems is the capability to read and write propositional graphs from and to a database. This provides both persistent storage for the graphs and a convenient way to distribute the graphs to the nodes of the ARS.

Finally, the system and techniques described herein have the advantage that it can receive the metadata from which propositional graphs are extracted as an Atom feed according to the Atom Syndication Format, and can post results back in accordance with the Atom Publishing Protocol. One of ordinary skill in the art will see that any other syndication method, such as Really Simple Syndication (RSS), could also be used.

Having described preferred embodiments of the invention it will now become apparent to those of ordinary skill in the art that other embodiments incorporating these concepts may be used. In particular, the description herein has shown the capability to automatically convert metadata of events in surveillance video into propositional graphs suitable for analysis using analogical reasoning. However, while certain specific embodiments have been shown and described, these are illustrative example, and not meant to limit the scope of the invention. For example, while the embodiments were shown with certain object modifiers (i.e., adjectives) such as quantity and color, the system could be configured to use other object modifiers, as well as predicate modifiers (i.e., adverbs). Also, while certain protocols and/or standards have been shown and used, such as VERL, VEML, MPEG-7, OWL, etc., other suitable protocols and/or standards may be used with the techniques described herein. Accordingly, it is submitted that the invention should not be limited to the described embodiments but rather should be limited only by the spirit and scope of the appended claims.

What is claimed is:

1. A computer-implemented method, comprising:
obtaining video annotation metadata;
identifying one or more events and one or more objects within the video annotation metadata;
associating one or more of the identified objects with each identified event as a corresponding predication; and
storing a propositional graph, as one of a source case or a target case, in a database for each predication by:
i) determining whether a particular event of the predication is a transitive predicate or an intransitive predicate;
ii-a) in response to the event being a transitive predicate, creating a logical subject role and logical object role;
ii-b) in response to the event being an intransitive predicate, creating an intransitive subject role; and
iii) binding one or more corresponding associated objects to corresponding created roles for the particular event in the propositional graph.

2. The method as in claim 1, wherein storing further comprises:
determining whether a particular object is associated with a quantity attribute; and
if so, binding the quantity attribute to the particular object in the propositional graph.

3. The method as in claim 1, wherein storing further comprises:
determining whether a particular object is associated with a color attribute; and
if so, binding the color attribute to the particular object in the propositional graph.

4. The method as in claim 1, wherein one or more of the identified objects are associated with object maps containing a plurality of attributes of a particular corresponding object.

5. The method as in claim 1, wherein storing further comprises:
determining whether a preposition is defined in the predication; and
if so, a) creating a prepositional object role, and b) binding a corresponding object of the preposition to the prepositional object role for the preposition in the propositional graph.

6. The method as in claim 1, wherein storing further comprises:
determining whether a locative relation is defined in the predication; and
if so, a) creating an adverbial subject role and an adverbial object role, and b) binding a corresponding event of the locative relation to the adverbial subject role and a corresponding object of the locative relation to the adverbial object role in the propositional graph.

7. The method as in claim 1, wherein storing further comprises:
determining whether a locative relation is defined in the predication; and
if so, a) creating an adverbial subject role and an adverbial object role in a locative propositional graph, and b) binding a corresponding event of the locative relation to the adverbial subject role and a corresponding object of the locative relation to the adverbial object role in the locative propositional graph.

8. The method as in claim 1, wherein storing further comprises:

determining a temporal relation between a pair of event predications;

creating a temporal object role and a temporal subject role in a temporal propositional graph; and binding a first event predication of the pair to the temporal object role and a corresponding second event predication of the pair to the temporal subject role in the temporal propositional graph.

9. The method as in claim 1, wherein storing further comprises:

comparing the target case to a plurality of source case propositional graphs; and matching the target case to a most similar source case of the plurality of source case propositional graphs.

10. The method as in claim 9, further comprising:

obtaining the plurality of source case propositional graphs from a cloud server.

11. The method as in claim 1, further comprising:

storing an ontological semantic layer of roles, role semantic elements, and object semantic elements.

12. The method as in claim 11, further comprising:

utilizing the ontological semantic layer both for annotating corresponding video and for identifying events and objects within the video annotation metadata.

13. The method as in claim 11, further comprising:

organizing the ontological semantic layer as a hierarchical ontological semantic layer such that objects and events not within the hierarchical ontological semantic layer have the ability to be represented by a corresponding superclass within the hierarchical ontological semantic layer.

14. The method as in claim 11, further comprising:

obtaining the ontological semantic layer from a cloud server.

15. The method as in claim 11, further comprising:

storing the ontological semantic layer on each of a plurality of analogical reasoner nodes configured to store the propositional graph.

16. A tangible, non-transitory, computer-readable medium having program instructions thereon, the program instructions when executed by a processor operable to:

obtain video annotation metadata;

identify one or more events and one or more objects within the video annotation metadata;

associate one or more of the identified objects with each identified event as a corresponding predication; and store a propositional graph, as one of a source case or a target case, in a database for each predication by being operable to:

i) determine whether a particular event of the predication is a transitive predicate or an intransitive predicate;

ii-a) in response to the event being a transitive predicate, create a logical subject role and logical object role;

ii-b) in response to the event being an intransitive predicate, create an intransitive subject role; and iii) bind one or more corresponding associated objects to corresponding created roles for the particular event in the propositional graph.

17. The computer-readable medium as in claim 16, wherein the program instructions when executed by the processor to store are further operable to:

determine whether a preposition is defined in the predication; and if so, a) create a prepositional object role, and b) bind a corresponding object of the preposition to the prepositional object role for the preposition in the propositional graph.

18. The computer-readable medium as in claim 16, wherein the program instructions when executed by the processor to store are further operable to:

determine whether a locative relation is defined in the predication; and if so, a) create an adverbial subject role and an adverbial object role, and b) bind a corresponding event of the locative relation to the adverbial subject role and a corresponding object of the locative relation to the adverbial object role in the propositional graph.

19. The computer-readable medium as in claim 16, wherein the program instructions when executed by the processor to store are further operable to:

determine whether a locative relation is defined in the predication; and if so, a) create an adverbial subject role and an adverbial object role in a locative propositional graph, and b) bind a corresponding event of the locative relation to the adverbial subject role and a corresponding object of the locative relation to the adverbial object role in the locative propositional graph.

20. The computer-readable medium as in claim 16, wherein the program instructions when executed by the processor to store are further operable to:

determine a temporal relation between a pair of event predications;

create a temporal object role and a temporal subject role in a temporal propositional graph; and bind a first event predication of the pair to the temporal object role and a corresponding second event predication of the pair to the temporal subject role in the temporal propositional graph.

21. The computer-readable medium as in claim 16, wherein the program instructions when executed by the processor are further operable to:

compare the target case to a plurality of source case propositional graphs; and match the target case to a most similar source case of the plurality of source case propositional graphs.

22. The computer-readable medium as in claim 16, wherein the program instructions when executed by the processor are further operable to:

store an ontological semantic layer of roles, role semantic elements, and object semantic elements, the ontological semantic layer organized as a hierarchical ontological semantic layer such that objects and events not within the hierarchical ontological semantic layer have the ability to be represented by a corresponding superclass within the hierarchical ontological semantic layer.

23. A system, comprising:

an input configured to obtain video annotation metadata;

a proposition extractor configured to identify one or more events and one or more objects within the video annotation metadata and to associate one or more of the identified objects with each identified event as a corresponding predication;

a database; and one or more analogical reasoner nodes comprising a processor and configured to store a propositional graph, as one of a source case or a target case, in the database for each predication by being configured to:

i) determine whether a particular event of the predication is a transitive predicate or an intransitive predicate;

ii-a) in response to the event being a transitive predicate, create a logical subject role and logical object role;

ii-b) in response to the event being an intransitive predicate, create an intransitive subject role; and iii) bind one or more corresponding associated objects to corresponding created roles for the particular event in the propositional graph.

* * * * *